US011089069B2

(12) United States Patent
Clinton

(10) Patent No.: US 11,089,069 B2
(45) Date of Patent: Aug. 10, 2021

(54) MOBILE SOCIAL NETWORK FOR SHARING MEDIA CAPTURED RECENTLY

(71) Applicant: Tobi Carver Clinton, Roseville, CA (US)

(72) Inventor: Tobi Carver Clinton, Roseville, CA (US)

(*) Notice: Subject to any disclaimer, the term of this patent is extended or adjusted under 35 U.S.C. 154(b) by 352 days.

(21) Appl. No.: 16/128,115

(22) Filed: Sep. 11, 2018

(65) Prior Publication Data

US 2019/0014163 A1 Jan. 10, 2019

Related U.S. Application Data

(63) Continuation of application No. 14/953,435, filed on Nov. 30, 2015, now Pat. No. 10,122,777.

(51) Int. Cl.
*G06F 16/00* (2019.01)
*H04L 29/06* (2006.01)
*G06F 16/9535* (2019.01)

(52) U.S. Cl.
CPC ...... *H04L 65/4084* (2013.01); *G06F 16/9535* (2019.01)

(58) Field of Classification Search
CPC .................................................. G06F 16/9535

USPC ........................................................ 707/723
See application file for complete search history.

(56) References Cited

U.S. PATENT DOCUMENTS

| 8,385,950 | B1* | 2/2013 | Wagner | H04L 67/325 |
| | | | | 455/466 |
| 2010/0009700 | A1* | 1/2010 | Camp, Jr. | H04N 1/00244 |
| | | | | 455/456.6 |
| 2015/0095178 | A1* | 4/2015 | Sanghavi | G06Q 30/0605 |
| | | | | 705/26.2 |

* cited by examiner

*Primary Examiner* — Chelcie L Daye
(74) *Attorney, Agent, or Firm* — Clinton Firm

(57) ABSTRACT

A mobile social network is provided for sharing media captured recently. The mobile social network includes an application server that receives, from a downloader mobile device, a request for media associated with a geographic location. The application server sends a media inquiry to one or more uploader mobile devices near the geographic location. The media inquiry includes information from the request for media. The application server receives a digital media file in response to the media inquiry. The digital media file includes metadata having an authentic capture time of the media associated with the geographic location. The application server generates a results summary, including a status of the digital media file based on the authentic capture time of the media. The application server sends the results summary to the downloader mobile device.

20 Claims, 15 Drawing Sheets example metadata
800

| | | |
|---|---|---|
| 802 | Mobile Device Model: | Apple iPhone 6 |
| 804 | Mobile Device Identifier: | TKWLM67PB3JW |
| 806 | Mobile Application: | ShareMedia, version 2.1 |
| 808 | Username: | UrbanHiker |
| 810 | Capture Location: | San Francisco, CA, USA |
| 812 | Capture Time: | 1:19:00 PM PST, March 30, 2011 |
| 814 | Modification Time: | 1:19:00 PM PST, March 30, 2011 |
| 816 | Camera: | Apple iPhone 6 back-side camera |
| 818 | Exposure: | Auto, f/2.4, 1/20 sec., ISO-200 |
| 820 | Flash: | Off, did not fire |
| 822 | Media Dimensions: | 3,264 x 2,448 JPEG |
| 824 | Filename: | 2011-30-11 13.19.00.jpg |
| 826 | File size: | 1.46 MB |

FIG. 8

MOBILE SOCIAL NETWORK FOR SHARING MEDIA CAPTURED RECENTLY

CROSS-REFERENCE TO RELATED APPLICATION

The instant application is a continuation of U.S. Pat. No. 10,122,777, filed Nov. 30, 2015, the disclosure of which is hereby incorporated by reference in its entirety.

FIELD

The embodiments of the invention relate generally to a mobile social network for sharing media captured recently.

BACKGROUND

Mobile social networking is where people with similar interests communicate via their mobile devices (e.g., mobile phones, tablet computers, or laptop computers). Examples of mobile social networks include Foursquare, Twitter, Instagram, Vine, and Path. These are online communities built around the functionality of mobile devices. Mobile social networks typically connect a user by checking the user's friends list, or by checking whom the user is following.

BRIEF SUMMARY

Mobile social networks have experienced a dedicated focus on mobile applications, including mobile communication and location-based services that require mobile devices and related technology. Meanwhile, with the expanse of mobile devices, almost everybody has a smart phone that can capture an image (e.g. picture, photograph, etc.) or a video. Accordingly, the current state of mobile social networks provides an opportunity for a paradigm shift in the way people interact on social networks. A typical social network connects a user with others by the user's friends list or by whom the user is following. In contrast, the present technology connects users according to geographical location, and provides media for a limited period of time based on an authentic time of capture.

The present technology enables users to download a recent visual update of any geographical location where a mobile device is connected to the mobile social network. The embodiments are summarized by the claims.

BRIEF DESCRIPTIONS OF THE DRAWINGS

Various embodiments are illustrated by way of example, and not by way of limitation, in the figures of the accompanying drawings.

FIG. 8 shows example metadata for a digital media file.

It will be recognized that some or all of the figures are for purposes of illustration and do not necessarily depict the actual relative sizes or locations of the elements shown. The figures are provided for the purpose of illustrating one or more embodiments with the explicit understanding that they will not be used to limit the scope or the meaning of the claims.

DETAILED DESCRIPTION

In this detailed description of the embodiments, numerous specific details are set forth. However, it will be obvious to one skilled in the art that the embodiments may be practiced without these specific details. In other instances, well known procedures and components are not described in detail so as not to obscure aspects of the embodiments unnecessarily.

A mobile social network for sharing media captured recently is described via systems, methods, and devices. As further described herein, the system connects users according to geographical location, and provides media for a limited time period based on an authentic capture time of the media.

System Overview

Figure 1:
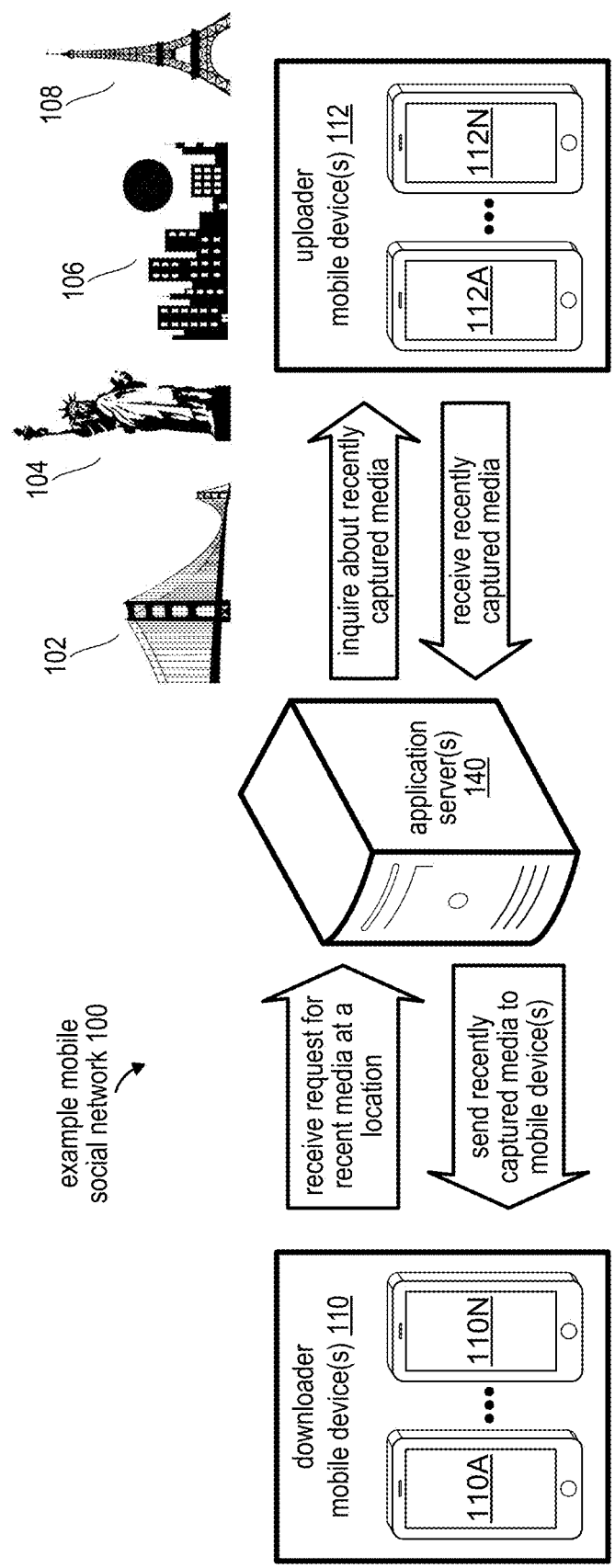
FIG. 1 is a high-level block diagram of an example mobile social network for sharing media captured recently.

FIG. 1 is a high-level block diagram of an example mobile social network 100 for sharing media captured recently. An application server 140 receives, from one or more of the downloader mobile devices 110A-110N, requests for recently captured media at one or more requested locations. For example, one downloader mobile device 110 may request an image (e.g., picture, photograph, etc.) of the Golden Gate Bridge 102; some downloader mobile devices 110 may request images of the Statue of Liberty 104; some downloader mobile devices 110 may request videos of nightlife in Atlanta 106; one downloader mobile device 110 may request an image of the Eiffel Tower 108, and so on.

The application server 140 sends (e.g., transmits, etc.) media inquiries, to one or more uploader mobile devices 112A-112N, for recently captured media at the requested locations. The media inquiries are based on, and include at least some information from, the requests received from the downloader mobile device(s) 110A-110N. The one or more uploader mobile devices 112A-112N capture media and upload the recently captured media to the application server 140. For example, some uploader mobile devices 112 may capture images of the Golden Gate Bridge; one uploader mobile device 112 may capture an image of the Statue of Liberty 104; some uploader mobile devices 112 may capture a video of nightlife in Atlanta 106; one uploader mobile device 112 may capture an image of the Eiffel Tower 108, and so on.

The application server 140 receives the recently captured media from one or more uploader mobile devices 112A-112N. The application server 140 sends (e.g., transmits, etc.) recently captured media to the appropriate downloader mobile devices 110A-110N, which display the recently captured media. The application server 140 updates the statuses of the recently captured media based on an authentic capture time for each media. The updating may including, without limitation, adding, expiring, removing, hiding, eliminating, deleting, and/or erasing media to/from a media database. The application server 140 sends (e.g., transmits, etc.) the updated statuses to the downloader mobile device(s) 110A-110N, and continues the cycle as appropriate.

Figure 2:
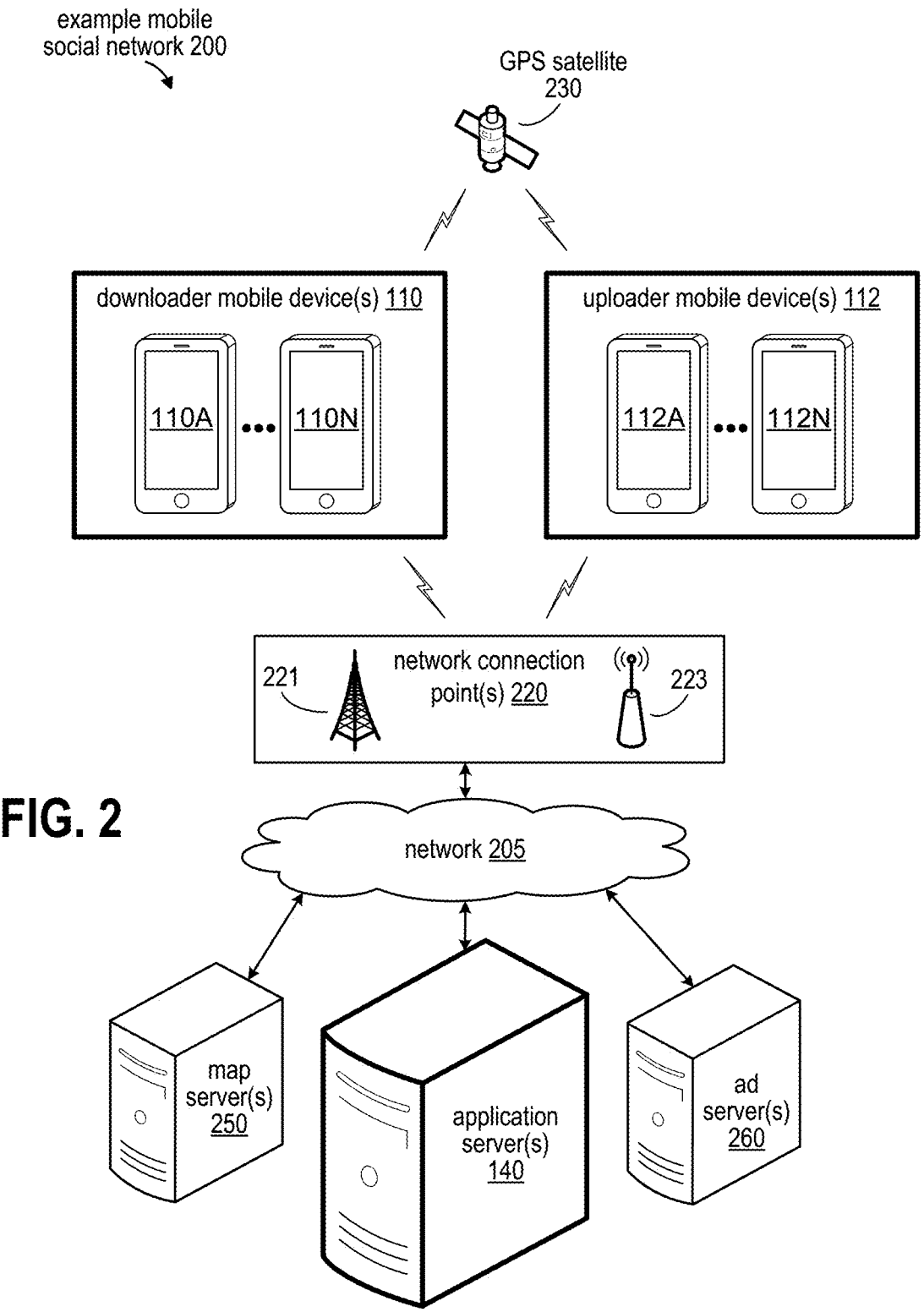
FIG. 2 is a conceptual block diagram of an example mobile social network for sharing media captured recently.

FIG. 2 is a conceptual block diagram of an example mobile social network 200 for sharing media captured recently. The mobile social network 200 includes a network 205 that couples network devices, including one or more downloader mobile devices 110, one or more uploader mobile devices 112, one or more application servers 140, one or more map servers 250, and one or more ad servers 260. The network 205 may include at least one of the following: an IP (Internet Protocol) network, a cellular network, a LAN (local area network), a WLAN (wireless local area network), and/or a WAN (wide area network), among other network types. A device includes hardware, software, or a combination thereof.

An application server 140 includes computer devices that can receive commands and/or data from the mobile devices (110, 112), the ad server 260, and/or the map server 250. The application server 140 can perform actions (e.g., inquire for media, receive media, obtain media, send media, etc.) in response to these commands and/or data. The application server 140 can also send commands and/or data (e.g., media, position information, etc.) to the mobile devices (110, 112), the ad server 260, and/or the map server 250.

The map server 250 includes computer devices that can receive commands and/or data from the application server 140 and/or the mobile devices (110, 112). The map server 250 can perform actions (e.g., retrieve a map, etc.) in response to these commands and/or data. The map server 250 can also send commands and/or data (e.g., map, etc.) to the application server 140 and/or the mobile devices (110, 112).

The ad server 260 includes computer devices that can receive commands and/or data from the application server 140 and/or the mobile devices (110, 112). The ad server 260 can perform actions (e.g., retrieve a map, etc.) in response to these commands and/or data. The ad server 260 can also send commands and/or data (e.g., advertisement, etc.) to the application server 140 and/or the mobile devices (110, 112).

The mobile devices (110, 112) are coupled to the network 205 via one or more network connection points 220, such as a cell tower 221 or a wireless network access point 223. The cell tower 221 is a cellular telephone site where antennae and electronic communications equipment are placed, usually on a radio mast, tower or other high place, to create a cell (or adjacent cells) in a cellular network. In a GSM (Global System for Mobile Communications) network, the connection point 220 is referred to as a BTS (base transceiver station). The wireless network access point 223 is a device that allows wireless devices to connect to a wired network by using Wi-Fi or another wireless standard. The wireless network access point 223 usually connects to a router, via a wired network, as a standalone device. Alternatively, the wireless network access point 223 can be an integral component of a router itself.

A downloader mobile device 110 can change modes and operate as an uploader mobile device 112, and vice versa. While downloading media (e.g., image, video, and/or audio) from the application server 140, a mobile device operates as one of the downloader mobile devices 110A-110N. While uploading media (e.g., image, video, and/or audio) to the application server 140, a mobile device operates as one of the uploader mobile devices 112A-112N. For example, a mobile device can operate as the downloader mobile device 110A by downloading media; the same mobile device can later operate as the uploader mobile device 112A by uploading media. Examples of a mobile device (110, 112) include, without limitation, a mobile phone, a tablet computer, and/or a laptop computer.

Example Mobile Device

Figure 3:
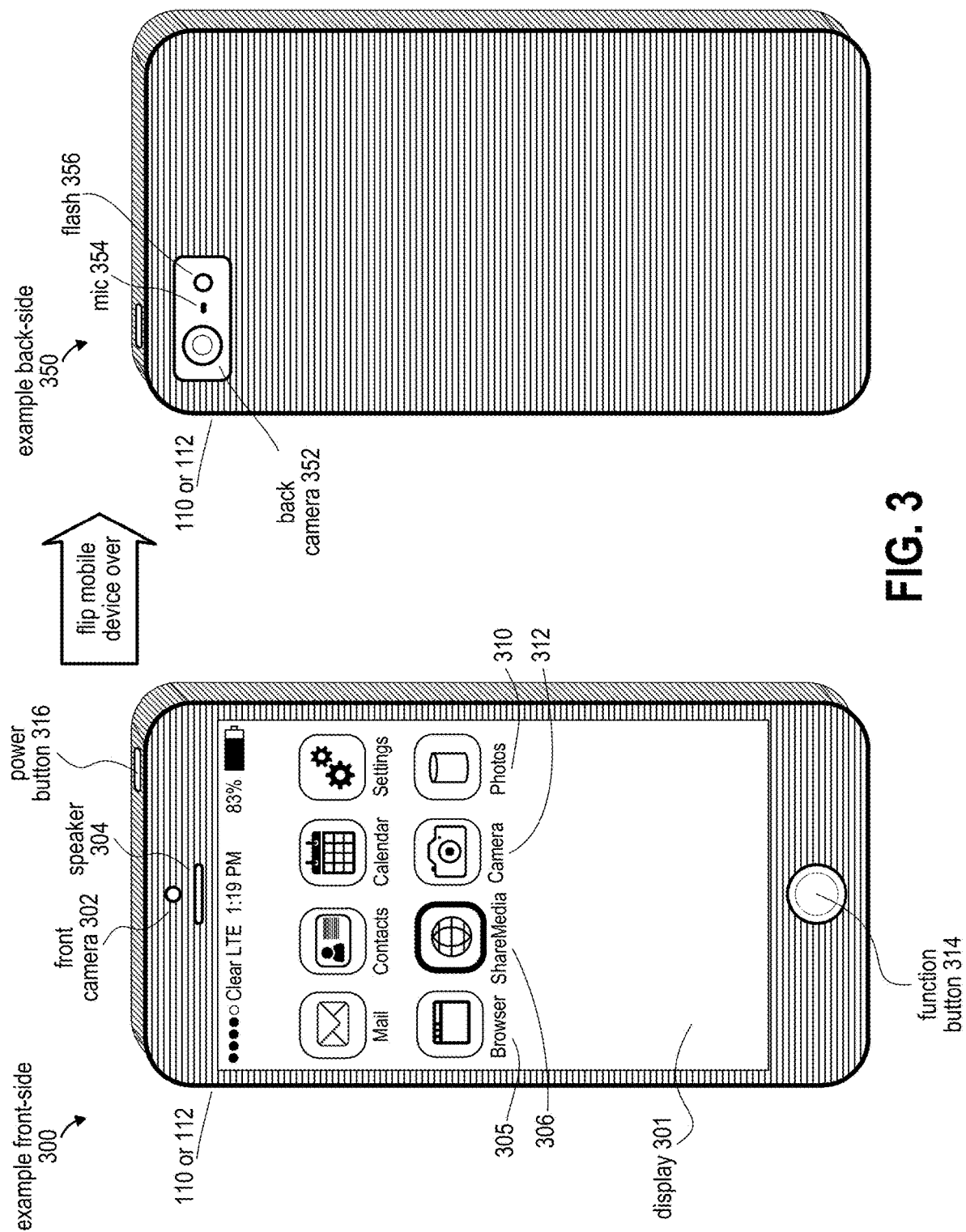
FIG. 3 is an example front-side and an example back-side of a mobile device.

FIG. 3 is an example front-side 300 and an example back-side 350 of a mobile device (110, 112). The front-side 300 includes, without limitation, a front camera 302, a speaker 304, a display 301, and a function button 314. The mobile device (110, 112) also includes a power button 316 located on a top-side. The back-side 350 includes, without limitation, a back camera 352, a microphone 354, and a flash 356.

The front camera 302 and the back camera 352 can capture an image or a video by electrically converting optical images into a digital representation of the optical image. The microphone 354 can capture audio by converting sound waves into electric currents or voltages, and then converting the electrical currents or voltages into a digital representation of the sound waves. The flash 356 can project extra light to improve the ability of the back camera 352 to capture an image or a video. The mobile device (110, 112) can then generate a digital media file that includes the digital representations of the media (e.g., image, video, and/or audio).

The display 301 (e.g., touchscreen) is currently displaying a home screen that includes, for example, thumbnails for various mobile applications. The example of FIG. 3 includes thumbnails for the following mobile applications: Mail application, Contacts application, Calendar application, Settings application, Browser application 305, ShareMedia application 306, Camera application 312, and Photos application 310. The thumbnail for the ShareMedia application 306, when pressed, can initiate an application for sharing recently captured media in accordance with operations of some embodiments. The thumbnail for the Camera application 312, when pressed, can initiate an application for capturing images and/or sound via the front camera 302, the back camera 352, and/or the microphone 354. The thumbnail for the Photos application 310, when pressed, can initiate an application for managing images, videos, and/or audio recordings stored in a media database (e.g., camera roll, photo library, etc.).

A mobile application is a software program that is typically downloadable to the mobile device (110, 112) from a server computer over the network 205. A mobile application can typically perform actions without the user having to go through the web browser (e.g., Browser application 305) on the mobile device (110, 112). In some embodiments, a user can log into the mobile social network (100, 200) by inputting a username and/or password into a mobile application (e.g., ShareMedia application 306) running on the mobile device (110, 112).

Example Download Modes

Figure 4:
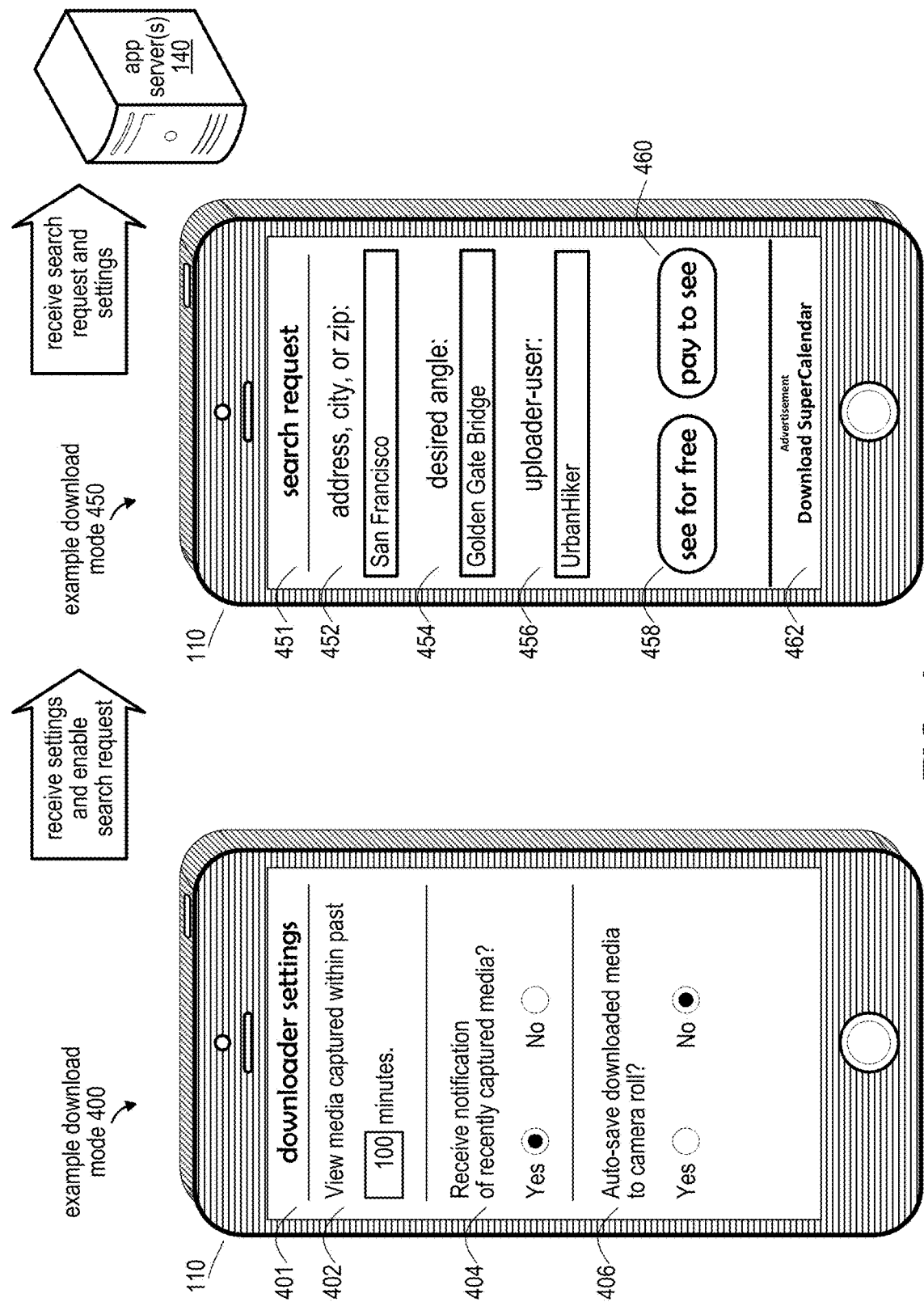
FIG. 4 shows example download modes for a downloader mobile device.

FIG. 4 shows example download modes (400, 450) for a downloader mobile device 110. As described with reference to FIGS. 1 and 2, a downloader mobile device 110 can request and receive recently shared media from the application server 140. Accordingly, the downloader mobile device 110, in FIG. 4, can provide an interface for inputting downloader settings 401 and for inputting a search request 451.

In the download mode 400, the downloader mobile device 110 displays example downloader settings 401, including a time period setting 402, a notification setting 404, and an auto-save setting 406. Upon receiving the downloader settings 401 in FIG. 4, the downloader mobile device 110 can send the downloader settings 401 to the application server 140 and/or save the downloader settings 401 on the downloader mobile device 110.

The time period setting 402 is an option to view media captured within a past time period (e.g., months, weeks, days, hours, minutes, or seconds) prior to the current time. The time period setting 402 is the acceptable time period in which the capture time may be in order for the downloader mobile device 110 to display the media. For example, the time period setting 402 is currently set at one hundred minutes, indicating the downloader mobile device 110 is set to display media having a time of capture that is no more than one hundred minutes prior to the current time. The time period 402 can be set by the user (as shown in FIG. 4) or set automatically by the system.

The time period setting 402 solves a common problem that is present in typical social media applications (e.g., Facebook, WhatsApp, Twitter, Foursquare, Instagram, WhatsApp, Vine, Path, etc.). In typical social media applications, the genuine age of media (e.g., image, video, and/or audio recording) is often unclear. A typical social media application may be configured to provide media based on a time of upload or a time of modification. The time of upload is typically the time at which the media is uploaded to the application server from the mobile device. The time of modification is the approximate time the media was modified (e.g., changed, edited, copied, and/or saved) on a user device. Unfortunately, if the media is posted based on the upload time or the modification time, then a downloader of the media cannot identify, or may have difficulty identifying, the genuine age of the originally captured media.

Fortunately, a capture time used in the present mobile social network (100, 200) is not equivalent to an upload time or a modification time. The time of capture is the approximate time of origination of the media. For example, the time of capture is the approximate time at which the camera 352 captured an optical image by converting the optical image into digital data for further processing by the mobile device (110, 112). For instance, the time of capture may be the approximate time at which the user presses a capture button (e.g., shutter button or function button on touchscreen) to capture one or more optical images through the camera (302, 352). The time of capture is further described with reference to FIGS. 7 and 8, among other figures.

The notification setting 404 in FIG. 4 is an option to receive a notification of recently captured media. The notification setting 404 is currently set to receive a notification upon receipt of a status of recently captured media, or upon receipt of recently capture media. The notification may include, without limitation, an audible alert, a vibration, a visual notification (e.g., a banner on the display, a pop-up window on the display, a badge application icon on the display), and/or any other type of notification. The notification setting 404 enables a user to do other things without missing out on recently captured media near the requested location. For example, the downloader mobile device 110 can exit the ShareMedia application 306, go to the Camera application 312, and still issue notifications of recently captured media near the requested location.

The auto-save setting 406 in FIG. 4 is an option to save downloaded media (e.g., image, video, and/or audio) automatically to a local media database (e.g., camera roll, photo library, etc.) on the mobile device 110. The auto-save setting 406 is currently set not to auto-save downloaded media to the local media database. The local media database is located on a memory device (e.g., RAM), or other storage device, of the mobile device (110, 112) and manages images and/or videos that are stored locally on the mobile device (110, 112). The local media database includes, for example, images, videos, and/or audios that the user has captured via the mobile device (110, 112). The local media database may also include images, videos, and/or audio that the user has saved to the mobile device (110, 112) from text messages, emails, websites, and/or any computer device that is coupled to the mobile device (110, 112). For example, if the user captures an image via the mobile device (110, 112), then the mobile device (110, 112) can immediately save the image to the local media database.

The downloader settings for the downloader mobile device 110 are not limited to the example downloader settings 401 shown in FIG. 4. Another example downloader setting includes, without limitation, a warning period for notification of media that is expiring relatively soon compared to other media. The warning period is a predetermined time period before the end of the time period 402. The warning period can be set by the user or set automatically by the system. The warning period is further described with reference to FIGS. 9 and 10, among other figures.

In the download mode 450, the downloader mobile device 110 displays an example search request 451. The search request 451 includes input fields for a search by using at least one of the following: location 452 (e.g., address, city, and/or zip code), desired angle 454, and/or uploader-user 456. The downloader mobile device 110 can send out the search request 451 with any combination of the location 452, the desired angle 454, and/or the uploader-user 456. However, a search request for a downloader mobile device 110 is not limited to the example fields shown in FIG. 4. Other example search request fields include, without limitation, user rating and media price.

The search field for the location 452 enables the downloader mobile device 110 to receive a search request based on a location, such as address, city, and/or zip code. For example, the location 452 is currently set for "San Francisco", meaning the user is requesting media related to San Francisco. Other location searches include, for example, the address "101 Market Street, San Francisco, Calif. 104114" or the zip code "104114".

The search field for the desired angle 454 enables the downloader mobile device 110 to receive a search request based on a more precise description of what the user wants to see. For example, the desired angle is currently set for "Golden Gate Bridge", meaning the user is requesting to see media related to the Golden Gate Bridge in San Francisco.

The search field for the uploader-user 456 enables the downloader mobile device 110 to receive a search request based on a particular uploader-user of the ShareMedia application 306. For example, the search field for the uploader-user 456 is currently set for "UrbanHiker", meaning the uploader-user is requesting to receive media captured by the uploader-user UrbanHiker.

The downloader mobile device 110 can search for free or for pay. For example, the download mode 450 includes buttons to initiate the search request, including a free download button 458 and a pay download button 460. Selection of the free download button 458 prompts the downloader mobile device 110 to send the search request 451 to the application server 140 without receiving a payment. In contrast, selection of the pay download button 460 prompts the downloader mobile device 110 to send the search request 451 to the application server 140 with a payment, an offer to pay, and/or a promise to pay. Payment schemes are further described with reference to FIG. 5, among other figures.

Referring again to FIG. 4, the application server 140 can also generate revenue by displaying advertisements on a mobile device (110, 112). For example, the application server 140 receives an advertisement 462 from the ad server 260 and sends (e.g., transmits, etc.) the advertisement 462 to the downloader mobile device 110, which then displays the advertisement 462. For instance, the advertisement 462 is a banner ad that includes an invitation to "Download SuperCalendar". Alternatively, the ad server 260 can send the advertisement directly to the downloader mobile device 110. The application server 140 can monetize the advertisement 462 by receiving a percentage of a payment from an advertiser. The application server 140 can also send a percentage of the payment to the uploader-user of the media.

Thus, FIG. 4 illustrates how the downloader mobile device 110 can receive the downloader settings 401 and/or the search request 451 from the user; how the downloader mobile device 110 sends (e.g., transmits, etc.) the downloader settings 401 and/or the search request 451 to the application server 140; and how the application server 140 receives the downloader settings 401 and/or the search request 451 from the downloader mobile device 110.

Example Upload Modes

Figure 5:
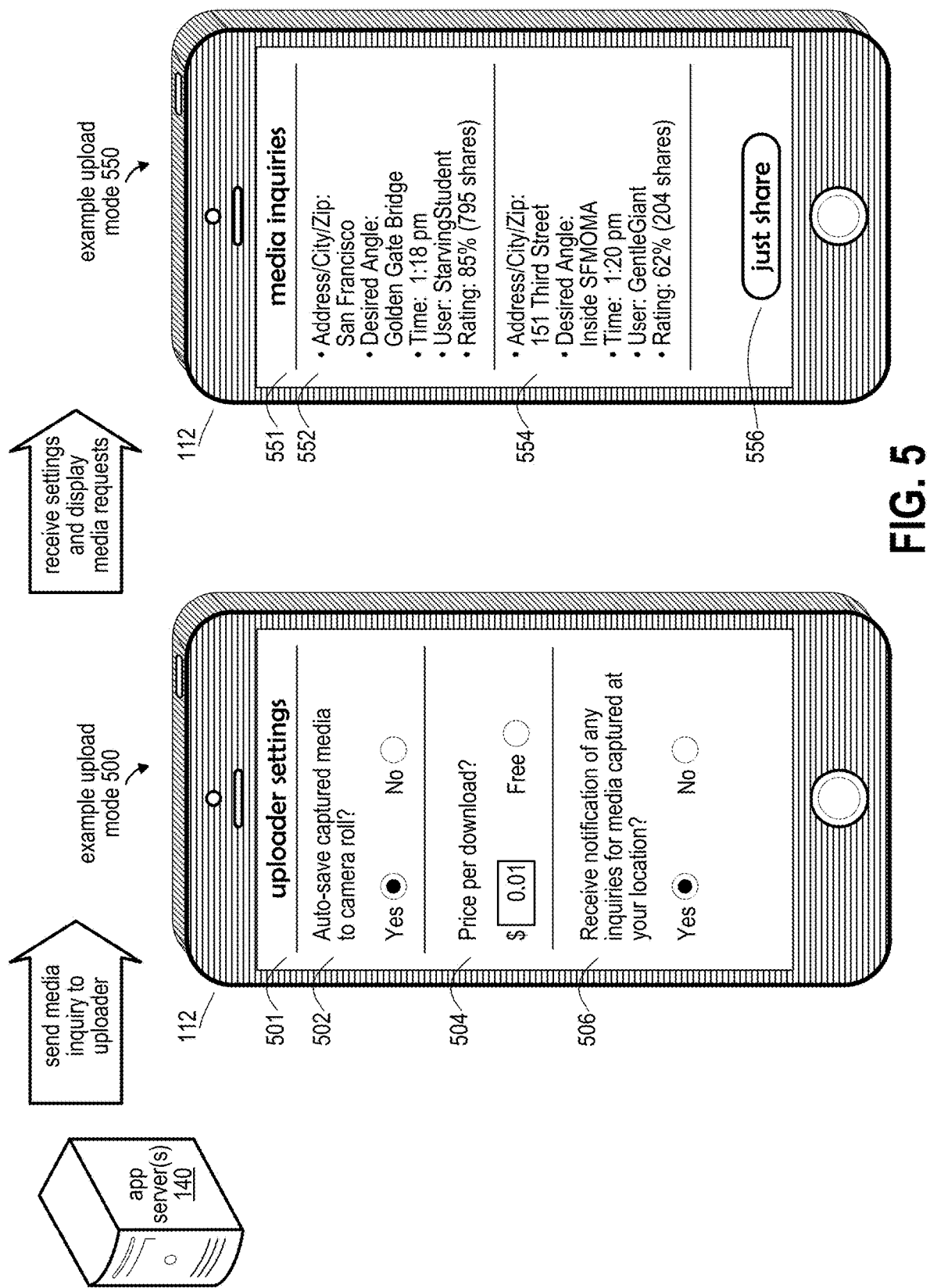
FIG. 5 shows example upload modes for an uploader mobile device.

FIG. 5 shows example upload modes (500, 550) for an uploader mobile device 112. As described with reference to FIGS. 1 and 2, the application server 140 sends (e.g., transmits, etc.) one or more inquiries for media to the uploader mobile device 112 that is near the requested location. The uploader mobile device 112 receives the inquiries for recently captured media. Each media inquiry sent to the uploader mobile device 112 is based on, and includes at least some information from, a media request inputted at a downloader mobile device 110. For example, the media inquiry may include information associated with the search request 451 of FIG. 4. Accordingly, the uploader mobile device 112 in FIG. 5 provides an interface for inputting uploader settings 501 and for responding to media inquiries 551.

In the upload mode 500, the uploader mobile device 112 displays example uploader settings 501, including an auto-save setting 502, a price setting 504, and a notifications setting 506. Upon receiving the uploader settings 501, the uploader mobile device 112 can send the uploader settings 501 to the application server 140 and/or save the uploader settings 501 on the uploader mobile device 112.

The auto-save setting 502 in FIG. 5 is an option to save captured media (e.g., image, video, and/or audio) automatically to a local media database (e.g., camera roll, photo library, etc.) on the uploader mobile device 112. For example, the auto-save setting 502 is currently set to auto-save captured media to the local media database. As described with reference to FIG. 4, a local media database is located on a memory device (e.g., RAM), or other storage device, of the mobile device (110, 112) and manages images and/or videos that are stored locally on the mobile device (110, 112).

The price setting 504 in FIG. 5 is an option to set a price-per-download of media captured by the uploader mobile device 112. Price-per-download may be the amount of money set to charge (e.g., receive) for each download of media captured by the uploader mobile device 112. For example, the price setting 504 is currently set for the uploader to charge/receive one cent per download of media captured by the uploader mobile device 112. If 5,000 downloader mobile devices 110 download media captured by the uploader mobile device 112, then this uploader receives $50 (5,000 times one cent) minus third party charges. Alternatively, the price setting 504 can be set to "free", meaning the uploader mobile device 112 is not set to charge per download of media captured by the uploader mobile device 112. In another embodiment, the price setting 504 may include a price per multiple downloads. For example, the price setting 504 may be set for the uploader to charge/receive $2.00 per every 100 downloads.

The notification setting 506 in FIG. 5 is an option to receive a notification of any inquiries for media at the location of the uploader mobile device 112. The notification setting 506 is currently set to receive a notification of any inquiries for media captured at the location of the uploader mobile device 112. The notification may include, without limitation, an audible alert, a banner on an edge of the display, a pop-up window, a badge application icon, a vibration, and/or any other type of notification. The notification setting 506 enables a user to do other things without missing out on requests for recently captured media near the location of the uploader mobile device 112. For example, the uploader mobile device 112 can exit the ShareMedia application 306, go to the Camera application 312, and still issue notifications of inquiries for recently captured media near the location of the uploader mobile device 112.

Uploader settings for the uploader mobile device 112 are not limited to the example uploader settings 501 shown in FIG. 5. Another example uploader setting includes, without limitation, a time limit for expiring captured media. For example, the uploader mobile device 112 can receive a time limit (e.g., 75 minutes or any other time) for captured media to be valid. After which, the system changes the captured media to having a status of expired. The system can delete, erase, or otherwise inactivate expired media from the system. Such a time limit can be set by the user or set automatically by the system.

In the upload mode 550, the uploader mobile device 112 displays example media inquiries 551 and an upload button 556. The media inquiries 551 include information from the requests, from downloader mobile device(s) 110, for recently captured media near the location of the uploader mobile device 112. For example, the media inquiries 551 include a media inquiry 552 and another media inquiry 554.

The media inquiry 552 indicates a downloader mobile device 110 is requesting media that meets the following criteria: city of San Francisco at an angle of the Golden Gate Bridge. The media inquiry 552 also indicates the following: the downloader mobile device 110 sent the request at 1:18 PST (Pacific Standard Time); the downloader-user is StarvingStudent; and the downloader-user has a user rating of 85% positive feedback out of 795 shares.

The media inquiry 554 indicates a downloader mobile device 110 is requesting media meeting the following criteria: 151 Third Street, San Francisco, at an angle inside the SFMOMA (San Francisco Museum of Modern Art). The media inquiry 554 also indicates the following: the downloader mobile device 110 sent the request at 1:20 pm PST; the downloader-user is GentleGiant; and the downloader-user has a user rating of 62% positive feedback out of 204 shares.

Accordingly, the user of the uploader mobile device 112 can respond to one of the media inquiries by selecting the media inquiry 552 or the other media inquiry 554. For example, the user can tap the touchscreen display 301 in a region where one of the media inquiries 552 or 554 appears. Alternatively, the uploader-user can decide to share media without responding to any media inquiry. For example, the uploader-user can select the upload button 556 (e.g., "just share" button), which enables the user to initiate sharing operations without responding to one of the media inquiries 552 or 554.

Figure 6:
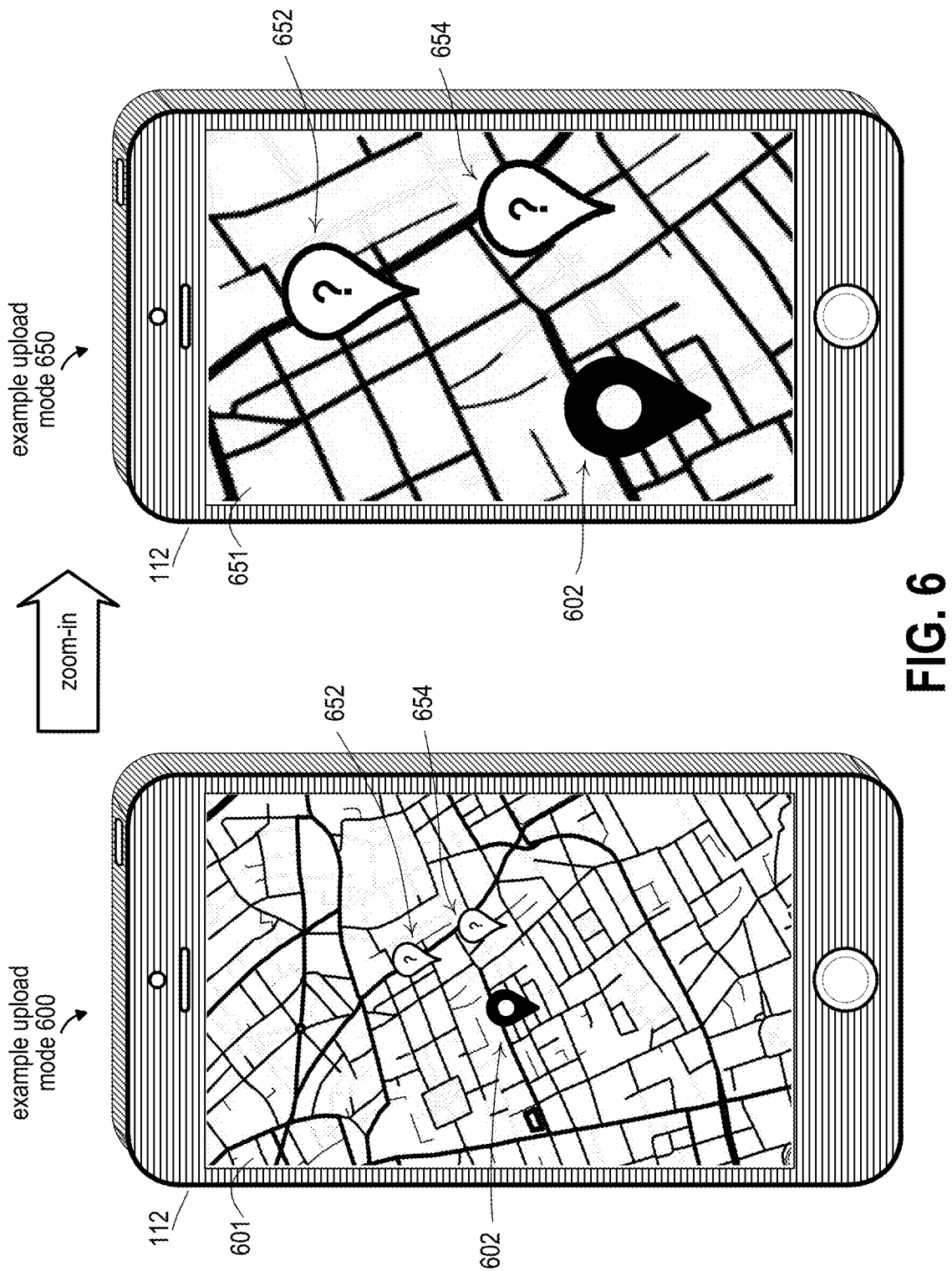
FIG. 6 shows more example upload modes for an uploader mobile device.

FIG. 6 shows more example upload modes (600, 650) for an uploader mobile device 112. The upload modes (600, 650) in FIG. 6 are graphical representations of the upload modes (500, 550) in FIG. 5. Accordingly, in FIG. 6, the uploader mobile device 112 provides a map-based response to media inquiries.

In the upload mode 600, the uploader mobile device 112 displays pins (602, 652, 654) on a map 601 to indicate relevant locations. The pin 602 indicates a current location 602 of the uploader mobile device 112. The pin 652 indicates a location for a search request from a downloader mobile device 110. The pin 654 indicates a location for another search request from a downloader mobile device 110.

The current location at the pin 602 is, for example, a place on Earth where the uploader is holding the uploader mobile device 112. The uploader mobile device 112 may carry out operations with a GPS (Global Positioning System) in order to calculate the location at the pin 602. As shown in FIG. 6, the uploader mobile device 112 then displays the pin 602 to indicate the current location of the uploader mobile device 112 on the map 601.

The pins 652 and 654 correspond to the media inquiries 552 and 554 in FIG. 5, respectively. In other words, the pin 652 in FIG. 6 corresponds to the media inquiry 552 in FIG. 5; the pin 654 in FIG. 6 corresponds to the media inquiry 554 in FIG. 5.

In the upload mode 650 of FIG. 6, the uploader mobile device 112 displays a map 651, which is a zoom-in representation of the map 601. For example, the uploader-user has selected a zoom-in feature that initiates operations for the uploader mobile device 112 to zoom-in and provide the map 651. Via the zoomed-in map 651, the uploader mobile device 112 can display the locations at pins 602, 652, and 654 more clearly for easier viewing and selection.

Figure 7:
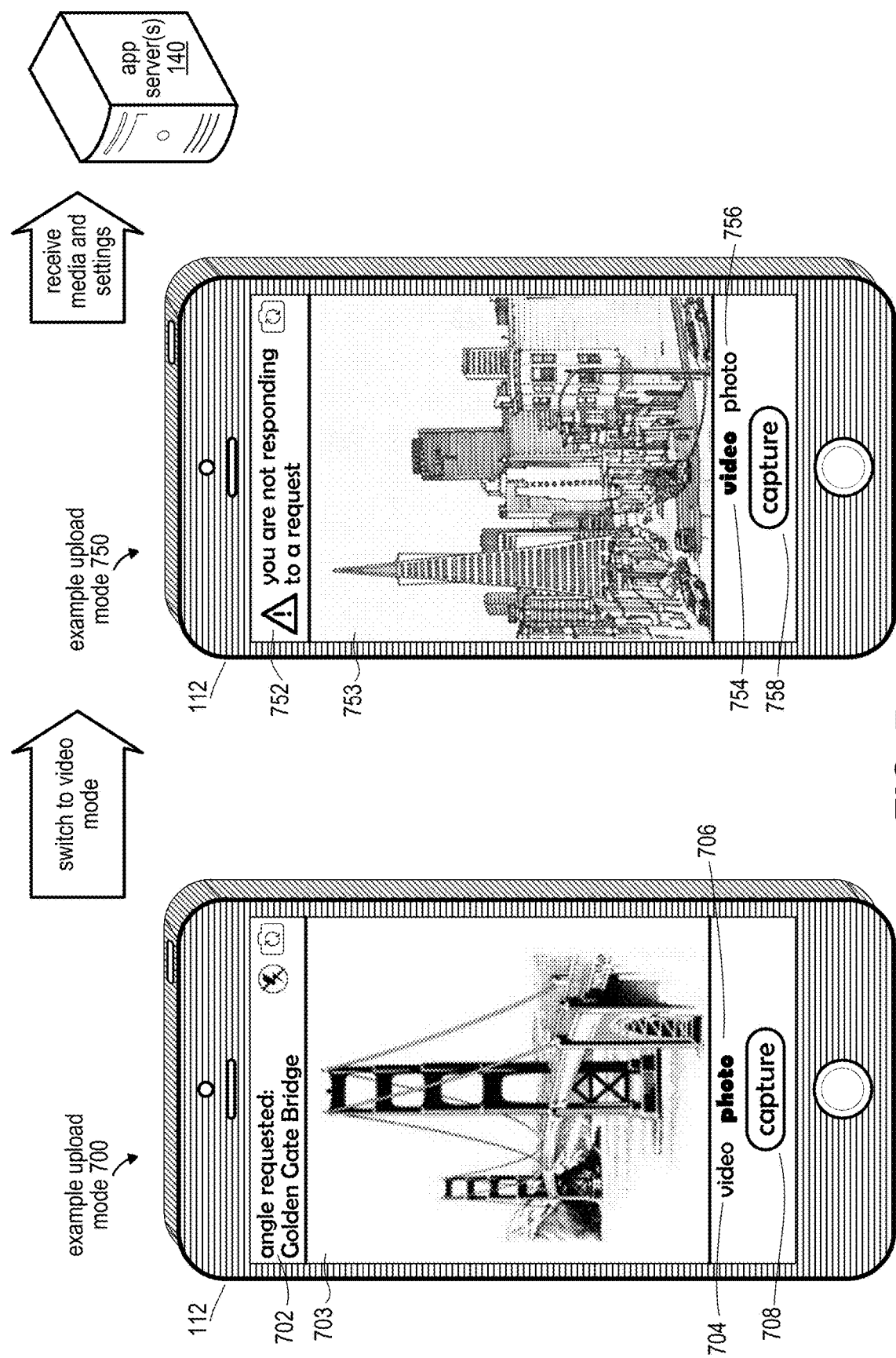
FIG. 7 shows more example upload modes for an uploader mobile device.

FIG. 7 shows more example upload modes (700, 750) for an uploader mobile device 112. The upload modes (700, 750) illustrate example user interfaces for capturing media to upload to the application server(s) 140.

In the upload mode 700, the uploader mobile device 112 is configured to capture an image of a scene. The uploader mobile device 112 displays, without limitation, an angle requested 702, a viewfinder 703, a video option 704, a photo option 706, and a capture button 708. The angle requested 702 is the Golden Gate Bridge. For example, the uploader mobile device 112 is set to respond to the media inquiry 552 of FIG. 5. As shown in FIG. 7, the viewfinder 703 currently displays a view of the Golden Gate Bridge, indicating a camera of the uploader mobile device 112 is pointed at the Golden Gate Bridge. The uploader mobile device 112 provides an option of capturing a video or an image (e.g., photo or photograph). In upload mode 700, the video option 704 is unselected; the photo option 706 is selected. Accordingly, the uploader mobile device 112 can capture an image of the Golden Gate Bridge when the capture button 708 is selected.

In the upload mode 750, the uploader mobile device 112 is in a video mode to capture a video of a scene. The uploader mobile device 112 displays, without limitation, a notification 752, a viewfinder 753, a video option 754, a photo option 756, and a capture button 758. The notification 752 warns the uploader-user that the uploader-user is not responding to any inquiry for media. For example, the uploader-user has decided to capture and upload media without responding to any particular request from a downloader mobile device 110. The viewfinder 753 currently shows a view of downtown San Francisco, indicating a camera of the uploader mobile device 112 is pointed at downtown San Francisco. The uploader mobile device 112 provides an option of capturing a video or an image (e.g., photo or photograph). In upload mode 750, the video option 754 is selected; the photo option 756 is unselected. Accordingly, the uploader mobile device 112 can capture a video of downtown San Francisco when the capture button 758 is selected.

After capturing media (e.g., image, video, and/or audio) into a digital media file, the uploader mobile device 112 can write metadata into the digital media file. Metadata is further described with reference to FIG. 8. Referring again to FIG. 7, after capturing media and writing metadata to the digital media file, the uploader mobile device 112 can store the digital media file on a local media database (e.g., camera roll, photo library, etc.) on the uploader mobile device 112. The uploader mobile device 112 can then upload (e.g., send) the digital media file to the application server 140. The application server 140 stores the uploaded media in a digital media database that is on, or controlled by, the application server 140.

FIG. 8 shows example metadata 800 for a digital media file. Metadata is data used to describe digital media by using metadata standards specific to a particular discipline. Metadata helps organize digital media, provide digital identification for the digital media, and helps support archiving and preservation of the digital media. The uploader mobile device 112 can embed the metadata 800 in the same digital media file that includes the image data. In another embodiment, the uploader mobile device 112 can store the metadata 800 separately from the image data. The system generates and processes the metadata 800 according to a metadata standard, such as XMP (Extensible Metadata Platform), IIM (Information Interchange Model), RDF (Resource Description Framework), Exif (Exchangeable image file format), and/or another metadata standard.

In the example of FIG. 8, the metadata 800 includes the following metadata fields:
mobile device model 802=Apple iPhone 6;
mobile device identifier 804=TKWLM67PB3JW;
mobile application 806 capturing the media=ShareMedia, version 2.1;
username 808 who captured the media=UrbanHiker;
capture location 810=San Francisco, Calif., USA;
capture time 812=1:19:00 PM PST, Mar. 30, 2011;
modification time 814=1:19:00 PM PST, Mar. 30, 2011;
camera 816=Apply iPhone 6 back-side camera;
exposure 818=auto, f/2.4, ¹⁄₂₀ sec., ISO-200;
flash 820=off, did not fire;
media dimensions 822=3264×2,448 JPEG,
filename 824=2011-30-11 13.19.00.jpg; and
file size 826=1.46 MB.

However, metadata is not limited to the metadata fields shown in FIG. 8. Metadata can include more or fewer metadata fields.

It is important to protect the authenticity and integrity of the metadata (e.g., capture time) associated with the digital media file. However, as described with reference to FIG. 4, it is oftentimes unclear if a typical mobile device is providing media based on upload time, modification time, or some other time. Such ambiguity is unacceptable for operations of some embodiments.

Accordingly, the uploader mobile device 112 can write the metadata 800 of FIG. 8 into the digital media file via the mobile application (e.g., the ShareMedia application 306) that is configured to carry out operations of some embodiments. This mobile application can communicate directly with the application server 140 for the purpose of uploading media captured via the mobile application. In some embodiments, this mobile application can prevent an external mobile application from writing metadata to the digital media file. An external mobile application is an application that is not the mobile application configured for carrying out operations of some embodiments. In some embodiments, the system can prevent the external mobile application from changing, modifying, deleting, and/or erasing the capture time in the digital media file. For example, in some embodiments, the local media database (e.g., Photos application 310 of FIG. 3) cannot change, modify, delete, and/or erase the capture time in the digital media file. Further, in some embodiments, the uploader mobile device 112 cannot upload media to the application server 140 if the media is not captured by using the mobile application that is configured to carry out operations of some embodiments. Such features help prevent an external mobile application from compromising the authenticity and integrity of the metadata 800. The mobile social network (100, 200) can thereby ensure the authenticity and integrity of the metadata 800.

After receiving a digital media file, the application server 140 can authenticate or reject the metadata 800, including the capture time 812, the mobile application 806, the mobile device serial identifier 804 (e.g., serial number), the username 808, and/or any other metadata. For instance, the application server 140 can authenticate the metadata 800 by determining, without limitation, at least one of the following: the capture time 812 is present and/or unmodified; the capture time 812 is equal to the modification time 814 (indicating the originally captured media is unmodified); the mobile application 806 that captured the media is the valid mobile application for authentication (e.g., the mobile application 806 is the application deliberately configured to carry out operations of some embodiments); the username 808 is recognized (e.g., the username 808 matches the username used for logging into to the system); the mobile device identifier 804 is recognized (e.g., the identifier 804 matches the identifier of the mobile device used for logging into to the mobile social network); and/or other metadata is authenticated. If the application server 140 determines any metadata 800 cannot be authenticated for purposes of operations of some embodiments, then the application server 140 can reject (e.g., discard, quarantine, ignore, remove, move, delete, and/or erase) the digital media file.

After authenticating or rejecting metadata in each digital media file, the application server 140 can use the authenticated metadata to organize, search, and/or update a digital media database. Using the metadata in the digital media files, the application server 140 also generates a results summary that is customized for each downloader mobile device 110 that requested media. The application server 140 sends (e.g., transmits, etc.) each results summary to the appropriate downloader mobile device 110.

More Example Download Modes

Figure 9:
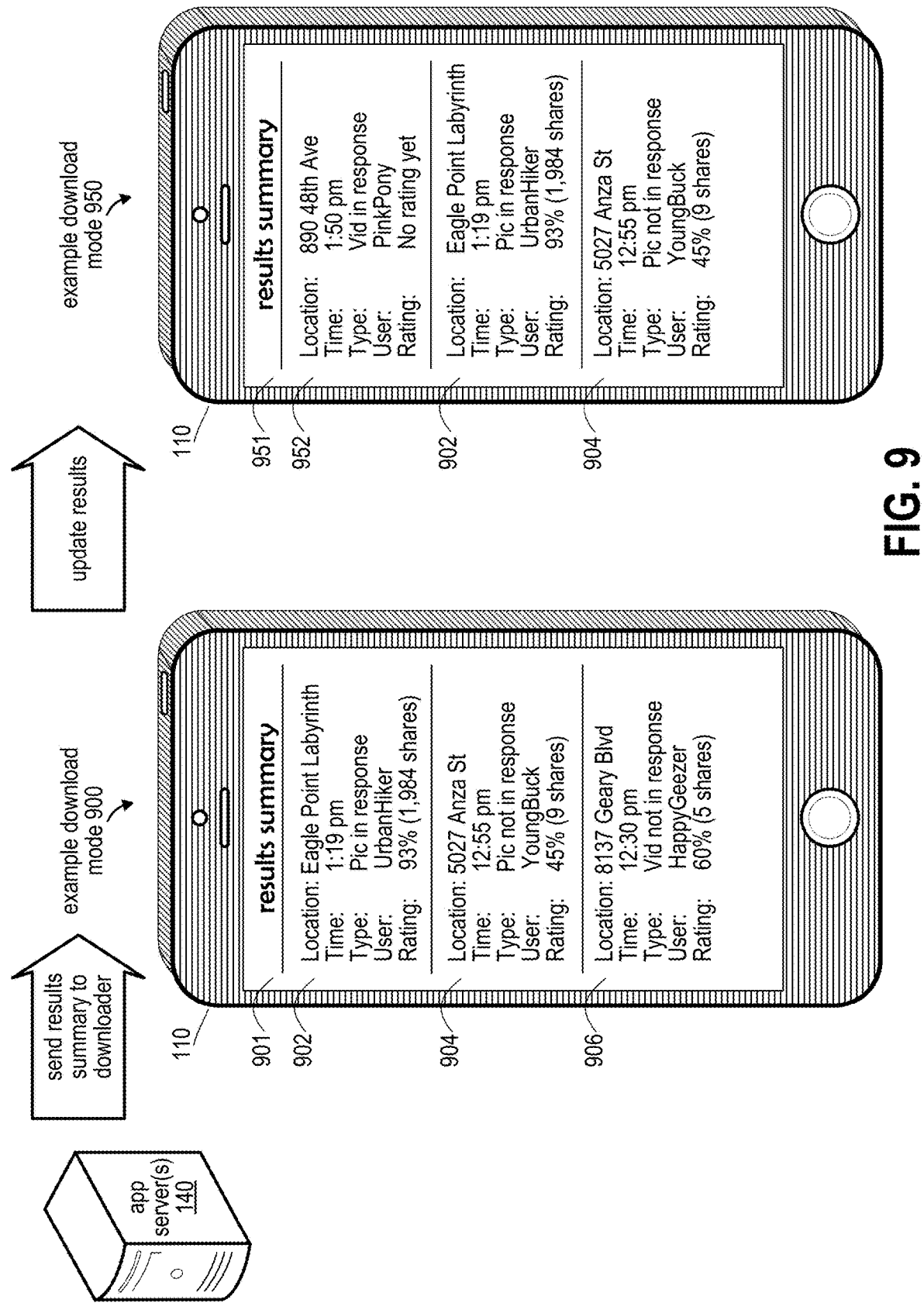
FIG. 9 shows more example download modes including results summaries having text results.

FIG. 9 shows more example download modes (900, 950) including results summaries (901, 951) having text results (902, 904, 906, 952). Each text result (902, 904, 906, 952) is associated with a single instance of media (e.g., image, video, and/or audio). Each text result (902, 904, 906, 952) includes information from metadata that the uploader mobile device 112 generated, as described with reference to FIGS. 7 and 8, among other figures. In the example of FIG. 9, each text result (902, 904, 906, 952) happens to originate from different uploader-users. In another embodiment, two or more text results may originate from the same uploader-user. In the example of FIG. 9, each text result (902, 904, 906, 952) includes a location of capture, a time of capture, a type of media, a username, and a user rating. The downloader mobile device 110 sorts the text results (902, 904, 906, 952) according to time of capture, and displays the text result (902, 952) having the more recent time of capture higher in the results summary (901, 951). In another embodiment, the downloader mobile device 110 or the application server 140 can sort the results summary (901, 951) according to another metric, such as capture location, media type, user rating, and/or any other metric.

In the example download mode 900, the results summary 901 includes text results 902, 904, and 906. The text result 902 includes the following information from metadata: the location of capture is Eagle Point Labyrinth in San Francisco; the time of capture is 1:19 pm; the type of media is an image in response to a request; the user who captured the image is UrbanHiker; and the user rating for UrbanHiker is 93% positive feedback out of 1,984 shares. The text result 904 includes the following information from metadata: the location of capture is 5027 Anza Street in San Francisco; the time of capture is 12:55 pm; the type of media is an image that is not in response to a request; the user who captured the image is YoungBuck; and the user rating for YoungBuck is 45% positive feedback out of nine shares. The text result 906 includes the following information from metadata: the location of capture is 8137 Geary Boulevard in San Francisco; the time of capture is 12:30 pm; the type of media is a video that is not in response to a request; the user who capture the video is HappyGeezer; and the user rating for HappyGeezer is 60% positive feedback out of 5 shares. The download mode 900 shows three results for explanatory purposes. However, in another embodiment, the results summary 901 may include more or fewer media.

The application server 140 and/or the downloader mobile device 110 can periodically update the results summary (901, 951). For example, the application server 140 may receive more media uploads that are relevant to requests from the downloader mobile device 110. Also, as time passes, the media in a results summary (901, 951) may become outdated. As described with reference to FIG. 4, the downloader mobile device 110 may have a period setting 402 (e.g., 100 minutes). Accordingly, the downloader mobile device 110 may update the results summary 901 by removing media having a time of capture that is older/more than the period setting 402. In the example download mode 950 of FIG. 9, the downloader mobile device 110 displays the updated results summary 951, including the new text result 952. The new text result 952 includes the following information from metadata: the location of capture is 890 48th Avenue; the time of capture is 1:50 pm; the type of media is a video that is in response to a request; the user who captured the video is PinkPony; and the user rating for Pink Pony is no rating yet.

The new text result 952 has a more recent time of capture than the other text results (902, 904). Accordingly, the text result 952 appears higher on the updated results summary 951. Also, the text result 906 from download mode 900 is bumped off of the updated results summary 951 and/or falls outside of the period setting 402. In another embodiment, the downloader mobile device 110 can distinguish the appearance of text results (902, 904) that fall within a warning period of the time period setting 402. The warning period is further discussed with reference to FIG. 10.

Figure 10:
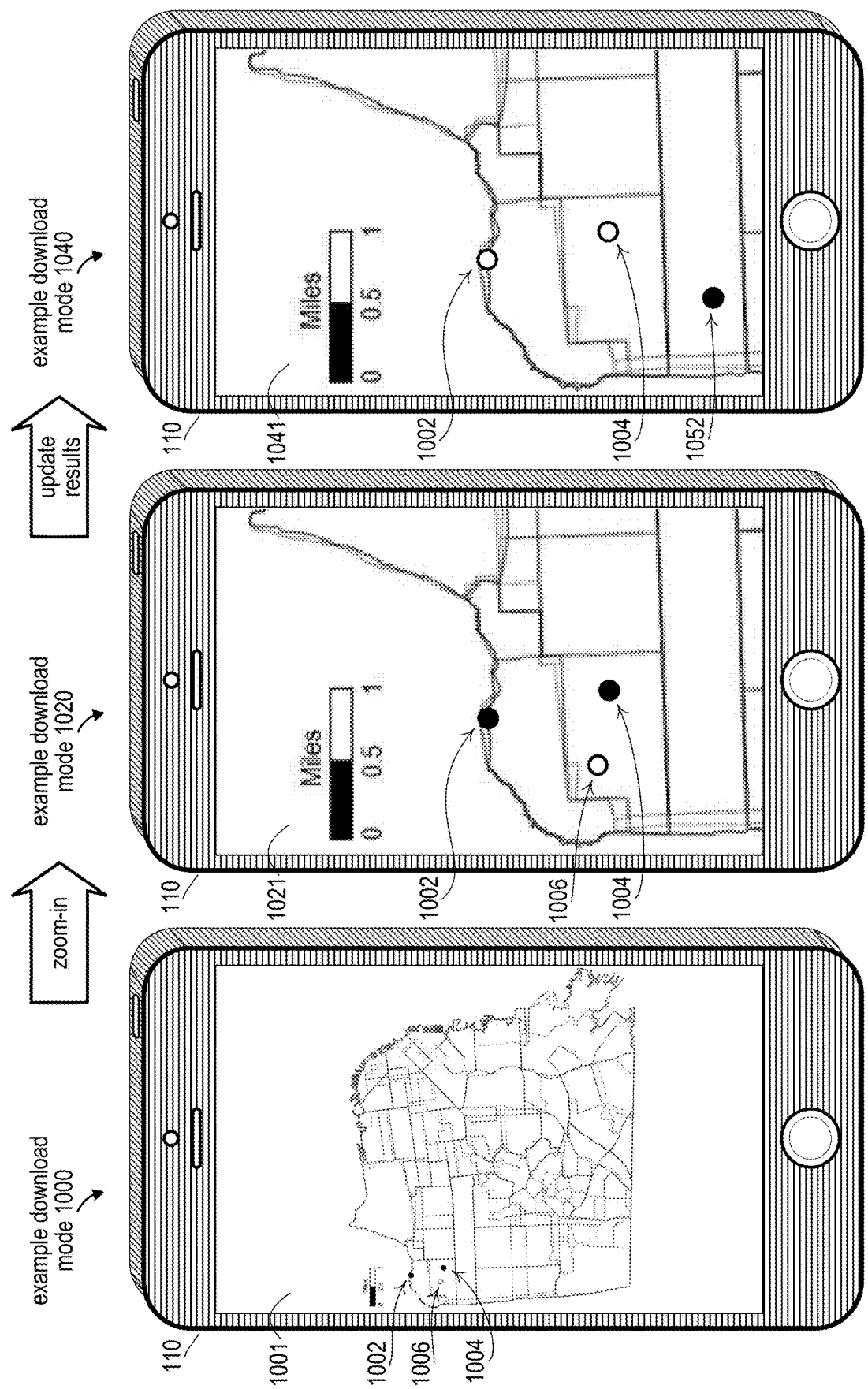
FIG. 10 shows more example download modes including results summaries having mapped results.

FIG. 10 shows more example download modes (1000, 1020, 1040) including results summaries having mapped results (1002, 1004, 1006, 1052). The download mode 1000 shows mapped results (1002, 1004, 1006) on a map 1001. The downloader mobile device 110 can zoom-in the map 1001 to display the mapped results (1002, 1004, 1006) on a zoomed-in map 1021 in the download mode 1020. The downloader mobile device 110 and/or the application server 140 can update the results summary. The downloader mobile device 110 can then display the updated results summary, including mapped results (1002, 1006, 1052) on an updated map 1041 in the download mode 1040.

Each mapped result (1002, 1004, 1006, 1052) is associated with a single instance of media (e.g., image, video, and/or audio). For example, each mapped result (1002, 1004, 1006, 1052) in FIG. 10 corresponds to a text result (902, 904, 906, 952) in FIG. 9, respectively. Specifically, the mapped result 1002 in FIG. 10 corresponds to the text result 902 in FIG. 9; the mapped result 1004 in FIG. 10 corresponds to the text result 904 in FIG. 9; the mapped result 1006 in FIG. 10 corresponds to the text result 906 in FIG. 9; and the mapped result 1052 in FIG. 10 corresponds to the text result 952 in FIG. 9.

As shown in FIG. 10, the downloader mobile device 110 updates the mapped search results from download mode 1020 to download mode 1040. The update includes either changing the appearance of a mapped result or removing a mapped result from the map. For example, the downloader mobile device 110 changes the appearance of mapped result 1002 to indicate the mapped result 1002 is within a warning period of the time period 402. For instance, assume the following: time period 402 is set at one hundred minutes; the warning period (set by the user or set automatically by the system) is between seventy minutes and one hundred minutes; and the time of capture of the media associated with mapped result 1002 is currently ninety minutes ago.

In response, the mapped result 1002 remains on the map 1041. However, the appearance of the mapped result 1002 changes from a solid circle in map 1021 to a hollow circle in map 1041. This appearance change provides a notification (e.g., warning) to the user that the mapped result 1002 is close to being removed from the map. Specifically, the time of capture of the media associated with the mapped result 1002 is more than seventy minutes ago but less than one hundred minutes ago. The mapped result 1004 has a similar change of appearance, indicating the time of capture of the media associated with the mapped result 1004 is more than seventy minutes ago but less than one hundred minutes ago. Accordingly, the user can decide that it may be more desirable to view the media that is going to expire sooner, and can then select one of the mapped results (1002, 1004) that is going to expire sooner.

For explanatory purposes, the mapped results (1002, 1004) are shown as changing from solid circles to hollow circles. However, the present technology is not so limited. There are many other ways to indicate a mapped result is soon approaching the end of the time period 402. In another embodiment, each mapped result can change in at least one of the following ways: a change in color, size, or shape; an audible notification associated with a particular time remaining; and/or an icon that shows a clock/timer for each mapped result, among other ways.

Further, the mapped results (1002, 1004) are shown as changing appearance only once. However the present technology is not so limited. Each mapped result (1002, 1004, 1006, 1052) can change appearance any number of times to indicate a particular closeness to the end of the set time period 402.

Figure 11:
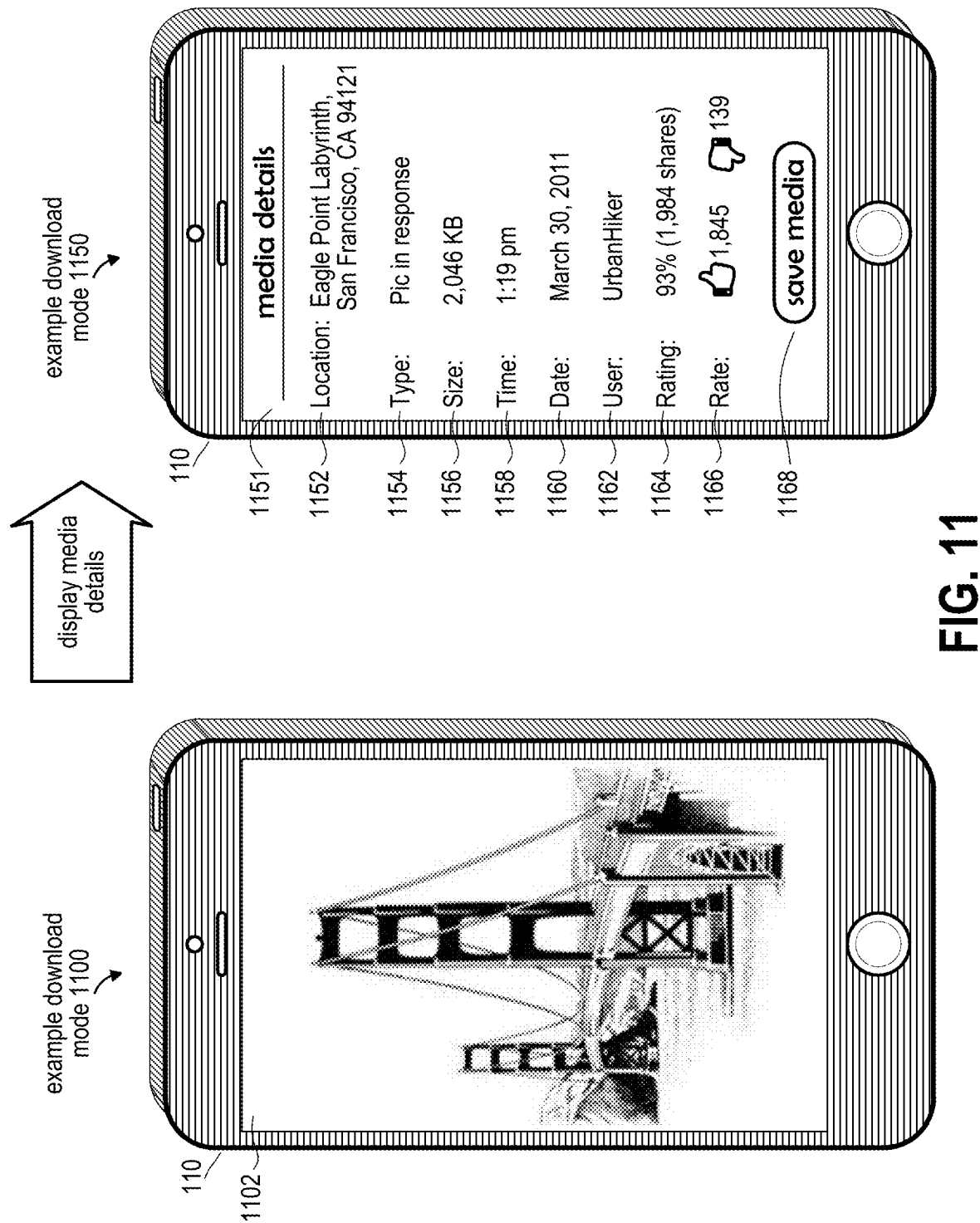
FIG. 11 shows more example download modes including selected media and media details.

FIG. 11 shows more example download modes (1100, 1150) including selected media 1102 and media details 1151. In download mode 1100, the downloader mobile device 110 has received a selection of the text result 902 in FIG. 9, which corresponds to mapped result 1002 in FIG. 10. As indicated in the text result 902 of FIG. 9, the selected media 1102 is an image in response to a request. As shown in FIG. 11, the selected media 1102 is an image of the Golden Gate Bridge.

The download mode 1050 illustrates how the downloader mobile device 110 can display media details 1151 for the selected media 1102. The media details 1151 include information from metadata generated by the uploader mobile device 112 that captured the media 1102. In the example of FIG. 11, the media details 1151 include a capture location 1152, a media type 1154, a media size 1156, a capture time 1158, a capture date 1160, an uploader-user 1162, a user rating 1164, and a rate option 1166. The media details 1151 include the following information from the metadata in the digital media file: the capture location 1152 is Eagle Point Labyrinth in San Francisco; the media type 1154 is an image in response to a request; the capture time 1158 is 1:19 pm; the capture date 1160 is Mar. 30, 2011; the uploader-user 1162 who captured the image is UrbanHiker; the user rating 1164 for UrbanHiker is 93% positive feedback out of 1,984 shares; and the rate option 1166 shows that UrbanHiker has previously received 1,845 thumbs up and 139 thumbs down. Accordingly, this downloader-user can be more informed when rating the uploader-user UrbanHiker.

The downloader mobile device 110 also provides an option to save the media to the local media database (e.g., camera roll, photo library, etc.) on the downloader mobile device 110. For example, the downloader mobile device 110 provides a save media button 1168. This option is important because the media 1102 may not later be available in the results summary. As described with reference to FIGS. 9 and 10, the application server 140 and/or the downloader mobile device 110 can update the results summary based on the capture time. The updating may include, without limitation, changing the notification type (e.g., changing solid circle to hollow circle), adding, expiring, removing, hiding, eliminating, deleting, and/or erasing the media 1102.

Methods Overview

Figure 12:
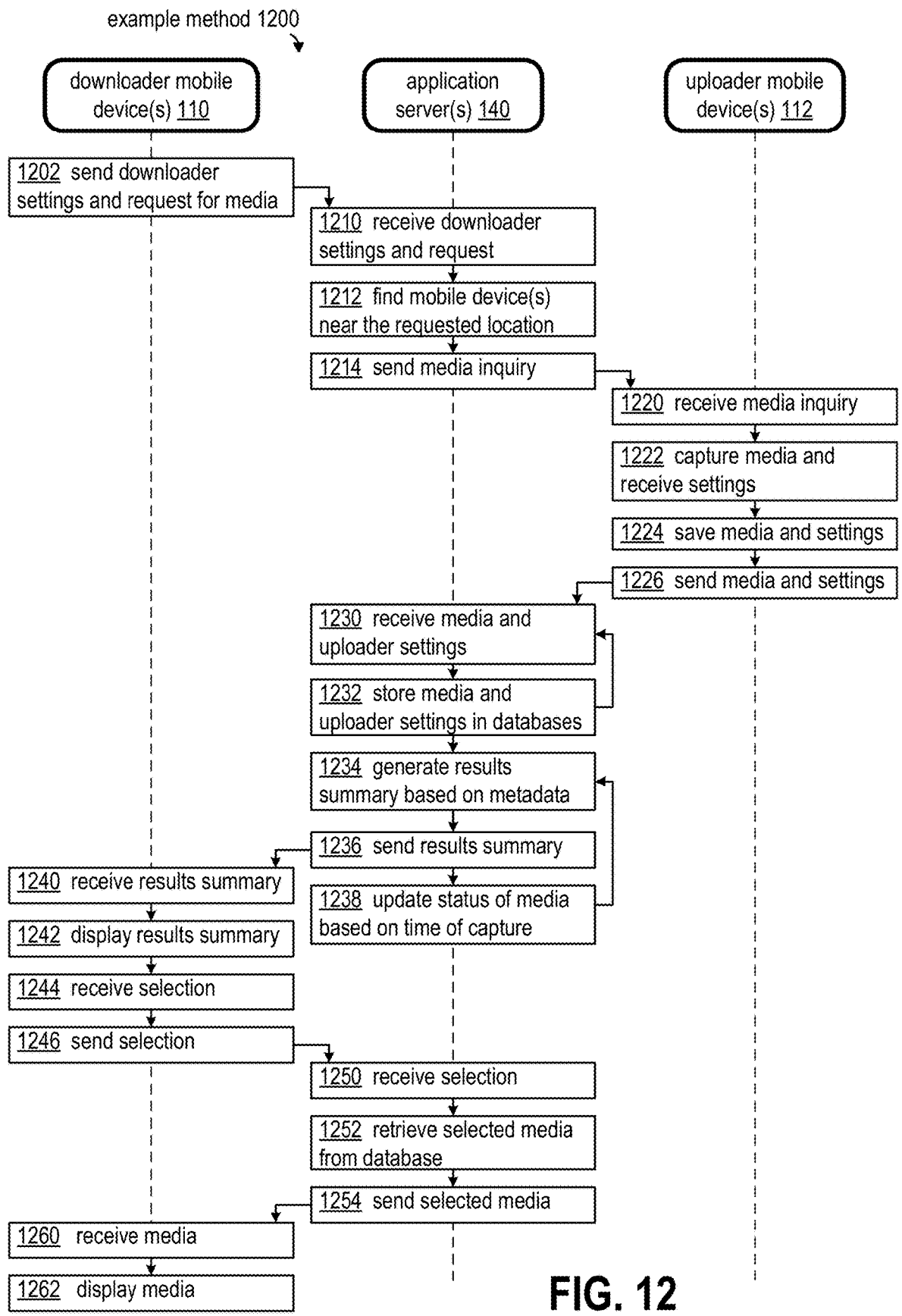
FIG. 12 is a flowchart of an example method for sharing recently captured media.

FIG. 12 is a flowchart of an example method 1200 for sharing recently captured media. The method 1200 may be carried out by one or more of the following: one or more downloader mobile devices 110, one or more application servers 140, and one or more uploader mobile devices 112.

At action 1202, a downloader mobile device 110 sends (e.g., transmits, etc.) downloader settings and a request for media captured recently at a designated location. The request for media may include, without limitation, a requested location, a requested angle, a requested user, and/or a requested user rating, among other requests. The downloader mobile device 110 does not necessarily send the request and the downloader settings during the same action 1202. For example, the downloader mobile device 110 can send downloader settings to the application server 140 as soon as the downloader mobile device 110 receives the downloader settings, and can send the request at a later time, or vice versa.

At action 1210, an application server 140 receives the downloader settings and the request for media. Again, the application server 140 does not necessarily receive the request and the downloader settings during the same action 1210. The application server 140 stores the downloader settings and the request. At action 1212, the application server 140 finds one or more uploader mobile devices 112 that match the requested location and/or any other requested parameters. At action 1214, the application 140 sends (e.g., transmits, etc.) an inquiry for media to the one or more uploader mobile devices 112 near the requested location. The media inquiry is based on, and includes at least some information from, the media request received from the downloader mobile device 110.

At action 1220, one or more uploader mobile devices 112 near the requested location receive the inquiry from the application server 140. At action 1222, at least one uploader mobile device 112 captures media and receives uploader settings from the uploader-user. The capturing of media may or may not be in response to the inquiry from the application server 140. For example, the uploader-user can decide to capture media without intentionally responding to any particular request from a downloader mobile device 110. At action 1224, the uploader mobile device 112 stores the media (e.g., digital media file) in the local media database (e.g., camera roll, photo library, etc.), and also stores the uploader settings in local storage. At action 1226, the uploader mobile device 112 sends (e.g., transmits, etc.) the digital media file(s) and/or uploader setting(s) to the application server 140. The uploader mobile device 112 does not necessarily send the media and the uploader settings during the same action 1226. For example, the uploader mobile device 112 can send uploader settings to the application server 140 as soon as the uploader mobile device 112 receives the uploader settings, and can send the media at a later time, or vice versa.

At action 1230, the application server 140 receives digital media file(s) and uploader setting(s) from at least one uploader mobile device 112. Again, the application server 140 does not necessarily receive the media and the uploader settings during the same action 1230. The application server 140 can authenticate the metadata (e.g., capture time, etc.) or can reject the digital media file if the metadata cannot be authenticated. At action 1232, the application server 140 stores the media in a media database, and stores the uploader settings in a settings database. At action 1234, the application server 140 generates a results summary based on the metadata in the digital media files. For example, the application server 140 sorts the media according to one or more metadata metrics, such as capture time, capture location, user rating, and/or another metric. At action 1236, the application server 140 identifies the relevant downloader mobile device(s) 110 and sends (e.g., transmits, etc.) the results summary to the relevant downloader mobile device(s) 110 that requested the media. Relevance may be determined by comparing metadata in the digital media file to information associated with each downloader mobile device 110. Example metrics that determine relevance include, without limitation, the following: whether or not the capture time is earlier than a predetermined amount time in the past (e.g., whether or not capture time is within a predetermined time period immediately prior to a current time); whether or not the media is captured in response to the request from the downloader mobile device 110; the proximity of the capture location to the requested location; and/or whether or not the uploader-user is requested by the downloader mobile device 110.

Meanwhile, at action 1238, the application server 140, periodically updates the status of media based on capture time. Updating the status of the media may including, without limitation, the following: updating the sort order (e.g., media captured more recently gets higher sort order or lower sort order), changing the notification type (e.g., change solid circle to hollow circle), adding, expiring, removing, hiding, eliminating, deleting, and/or erasing media from the media database on, or controlled by, the application server 140. However, the present technology is not so limited. In another embodiment, the application server 140 can update the status of media based on another metadata metric, such as capture location (e.g., proximity to requested location determines sort order), user rating (e.g., higher user rating gets higher sort order or lower sort order), and/or another metric. Accordingly, the application server 140 periodically sends (e.g., transmits, etc.) an updated results summary to the downloader mobile device 110 that requested media.

At action 1240, the downloader mobile device 110 receives the results summary or the updated results summary. At action 1242, the downloader mobile device 110 displays the results summary. At action 1244, the downloader mobile device 110 receives a selection of one of the media in the results summary. For example, the downloader-user selects one of the media in the results summary by pressing an appropriate area of a touchscreen. At action 1246, the downloader mobile device 110 sends (e.g., transmits, etc.) a request for the selected media to the application server 140.

At action 1250, the application server 140 receives the selection of the media. At action 1252, the application server 140 retrieves the selected media (e.g., digital media file) from the media database on, or controlled by, the application server 140. At action 1254, the application server 140 sends (e.g., transmits, etc.) the selected media (e.g., digital media file) to the downloader mobile device 110. Alternatively, the application server 140 sends (e.g., transmits, etc.) a modified version (e.g., resized smaller or larger version) of the digital media file.

At action 1260, the downloader mobile device 110 receives the selected media. At action 1262, the downloader mobile device 110 displays the selected media. In another embodiment, the downloader mobile device 110 can receive the one or more digital media files with the results summary in action 1240. However, such an action may not be desirable if the results summary is associated with a relatively large amount of media data. Sending the results summary typically requires significantly less bandwidth than sending digital media files.

Figure 13:
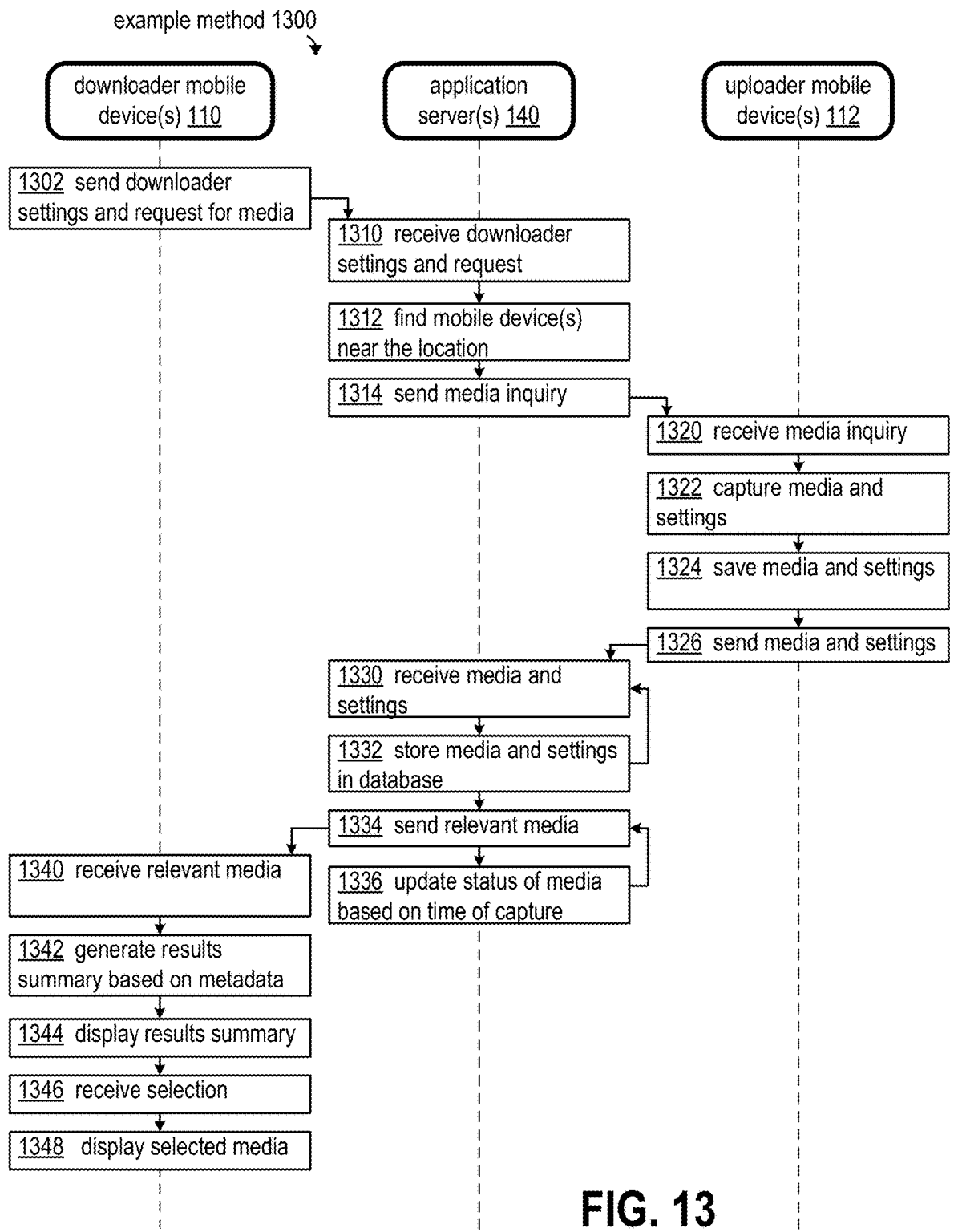
FIG. 13 is a flowchart of another example method for sharing recently captured media.

FIG. 13 is a flowchart of another example method 1300 for sharing recently captured media. An important point about method 1300 is that the downloader mobile device 110 generates the results summary. In contrast, in method 1100, the downloader mobile device 110 received the results summary from the application server 140.

At action 1302, the downloader mobile device 110 sends (e.g., transmits, etc.) downloader settings and a request for media captured recently at a designated location. The request for media may include, without limitation, a requested location, a requested angle, a requested user, and/or a requested user rating, among other requests. The downloader mobile device 110 does not necessarily send the request and the downloader settings during the same action 1302. For example, the downloader mobile device 110 can send downloader settings to the application server 140 as soon as the downloader mobile device 110 receives the downloader settings, and can send the request at a later time, or vice versa.

At action 1310, the application server 140 receives the downloader settings and the request for media. Again, the application server 140 does not necessarily receive the request and the downloader settings during the same action 1310. The application server 140 stores the downloader settings and the request. At action 1312, the application server 140 finds one or more uploader mobile devices 112 that match the requested location and/or any other requested parameters. At action 1314, the application server 140 sends (e.g., transmits, etc.) an inquiry for media to the one or more uploader mobile devices 112. The media inquiry is based on, and includes at least some information from, the media request received from the downloader mobile device 110.

At action 1320, one or more uploader mobile devices 112 receive the inquiry from the application server 140. At action 1322, at least one uploader mobile device 112 captures media and receives uploader settings from the uploader-user. The capturing of media may or may not be in response to the inquiry from the application server 140. For example, the uploader-user can decide to capture media without intentionally responding to any particular request from a downloader mobile device 110. At action 1324, the uploader mobile device 112 stores the media (e.g., digital media file) in the local media database (e.g., camera roll, photo library, etc.), and also stores the uploader settings to local storage. At action 1326, the uploader mobile device 112 sends (e.g., transmits, etc.) the digital media file(s) and/or uploader setting(s) to the application server 140. The uploader mobile device 112 does not necessarily send the media and the uploader settings during the same action 1326. For example, the uploader mobile device 112 can send uploader settings to the application server 140 as soon as the uploader mobile device 112 receives the uploader settings, and can send the media at a later time, or vice versa.

At action 1330, the application server 140 receives digital media file(s) and uploader setting(s) from at least one mobile device 112. Again, the application server 140 does not necessarily receive the media and the uploader settings during the same action 1330. The application server 140 can authenticate the metadata (e.g., capture time, etc.) or can reject the digital media file if the metadata cannot be authenticated. At action 1332, the application server 140 stores the media in a media database, and stores the uploader settings in a settings database. At action 1334, the application server 140 sends (e.g., transmits, etc.) the relevant media (e.g., digital media files) based on the metadata in the digital media files. Alternatively, the application server 140 sends (e.g., transmits, etc.) a modified version (e.g., resized version, etc.) of the digital media file. Relevance may be determined by comparing metadata in the digital media file to information associated with each downloader mobile device 110. Relevance may be determined, for example, by at least one of the following: whether or not the capture time is earlier than a predetermined amount time in the past (e.g., whether or not capture time is within a predetermined time period immediately prior to a current time); whether or not the media is captured in response to the request from the downloader mobile device 110; the proximity of the capture location to the requested location; and/or whether or not the uploader-user is requested by the downloader mobile device 110, and so on.

Meanwhile, at action 1336, the application server 140, periodically updates the status of media based on capture time. The updating may including, without limitation, updating the sort order (e.g., media captured more recently gets higher sort order or lower sort order), changing notification type (e.g., change solid circle to hollow circle), adding, expiring, removing, hiding, eliminating, and/or deleting media. However, the present technology is not so limited. In another embodiment, the application server 140 can update the status of media based on another metadata metric, such as capture location (e.g., proximity to requested location determines sort order), user rating (e.g., higher user rating gets higher sort order or lower sort order), and/or another metric. Accordingly, the application server 140 periodically sends (e.g., transmits, etc.) an updated results summary to the downloader mobile device 110 that requested media.

At action 1340, the downloader mobile device 110 receives the relevant digital media files. At action 1342, the downloader mobile device 110 generates a results summary based on the metadata in the digital media file(s). For example, the downloader mobile device 110 sorts the media according to one or more metadata metrics, such as capture time, capture location, user rating, and/or another metric. At action 1344, the downloader mobile device 110 displays the results summary. At action 1346, the downloader mobile device 110 receives a selection of one of the media in the results summary. For example, the downloader-user selects one of the media in the results summary by pressing an appropriate area of a touchscreen. At action 1348, the downloader mobile device 110 displays the selected media.

Figure 14:
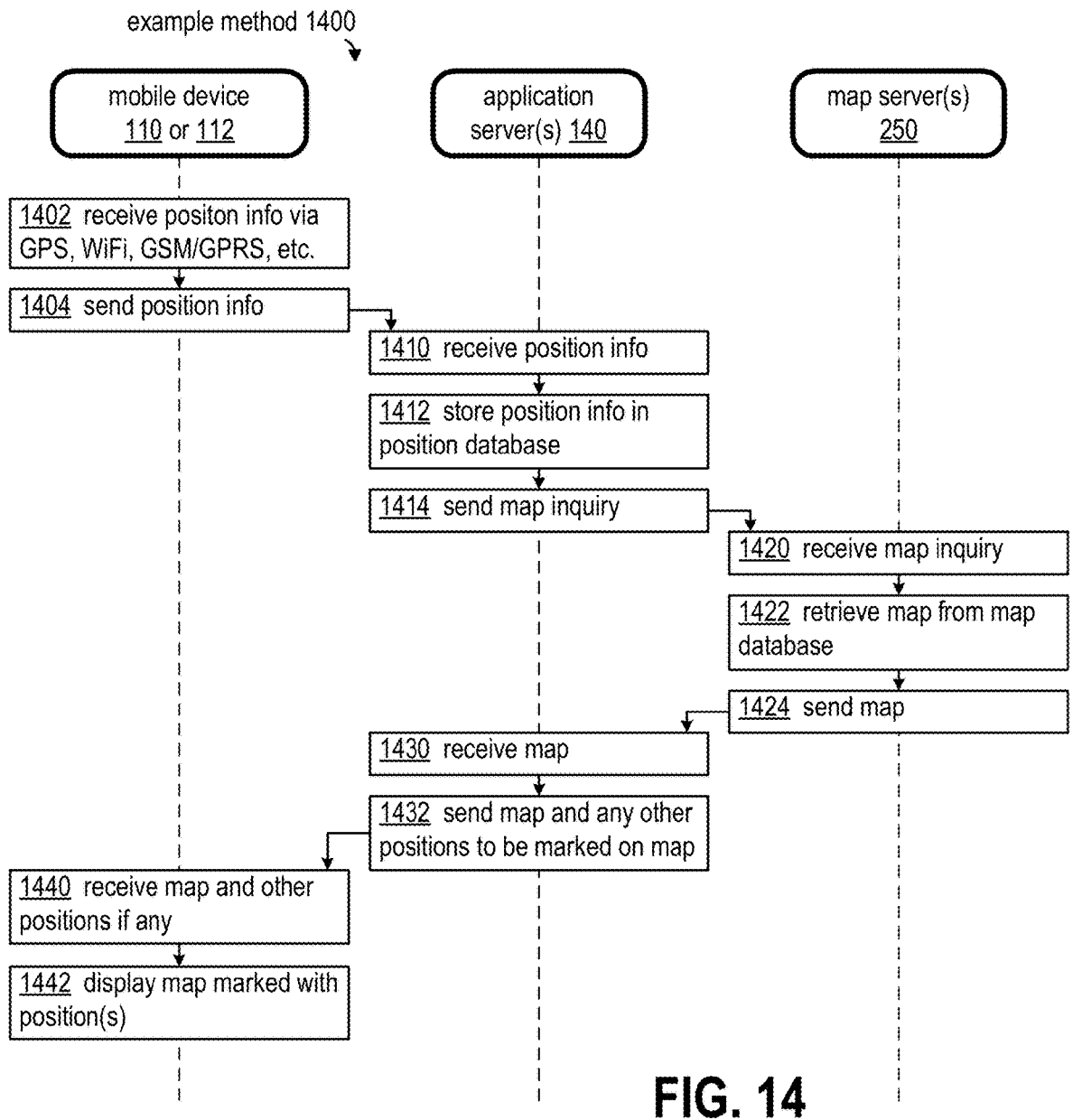
FIG. 14 is a flowchart of an example method for calculating a location of a mobile device.

FIG. 14 is a flowchart of an example method 1400 for calculating a location of a mobile device (110, 112). The method 1400 may be carried out by one or more of the following: a mobile device (110, 112), one or more application servers 140, and one or more map servers 250.

At action 1402, the mobile device (110, 112) receives position information. The position information includes, without limitation, position coordinates (e.g., latitude, longitude, and altitude) and a current time. The mobile device (110, 112) can receive the position information via a GPS (Global Positioning System), a WLAN (wireless local area network), WiFi, a GSM (Global System for Mobile Communications), a GPRS (General Packet Radio Services), and/or another positioning system. At action 1404, the mobile device (110, 112) sends (e.g., transmits, etc.) the position information to at least one of the application servers 140. In another embodiment, the mobile device (110, 112) can send the position information directly to at least one of the map servers 250.

At action 1410, the application server 140 receives the position information. At action 1412, the application server 140 stores the position information in a position database. At action 1414, the application server 140 sends (e.g., transmits, etc.) the position information and an inquiry for a map to a map server 250.

At action 1420, the map server 250 receives the position information and the inquiry for the map. At action 1422, the map server 250 retrieves a relevant map from a map database based on the position information. The relevant map includes the location of the mobile device (110, 112). At action 1424, the map server 250 sends (e.g., transmits, etc.) the relevant map to the application server 140. In another embodiment, the map server 250 can send the relevant map directly to the mobile device (110, 112).

At action 1430, the application server 140 receives the relevant map. At action 1432, the application server 140 sends (e.g., transmits, etc.) the relevant map, and any other positions to be marked on the relevant map, to the mobile device (110, 112). For example, the application server 140 may send the following information to the mobile device (110, 112): the relevant map, positions of media requests, and/or positions of captured media, among other information.

At action 1440, the mobile device (110, 112) receives the relevant map and any other positions to be marked on the relevant map. At action 1442, the mobile device (110, 112) displays the relevant map marked with item positions (e.g., position of the mobile device, position of any search request, and/or position of captured media, etc.)

Other actions, operations, processes, and/or details are described with reference to figures and may be a part of the methods of FIGS. 12-14, depending on the implementation.

Computer Apparatus

Figure 15:
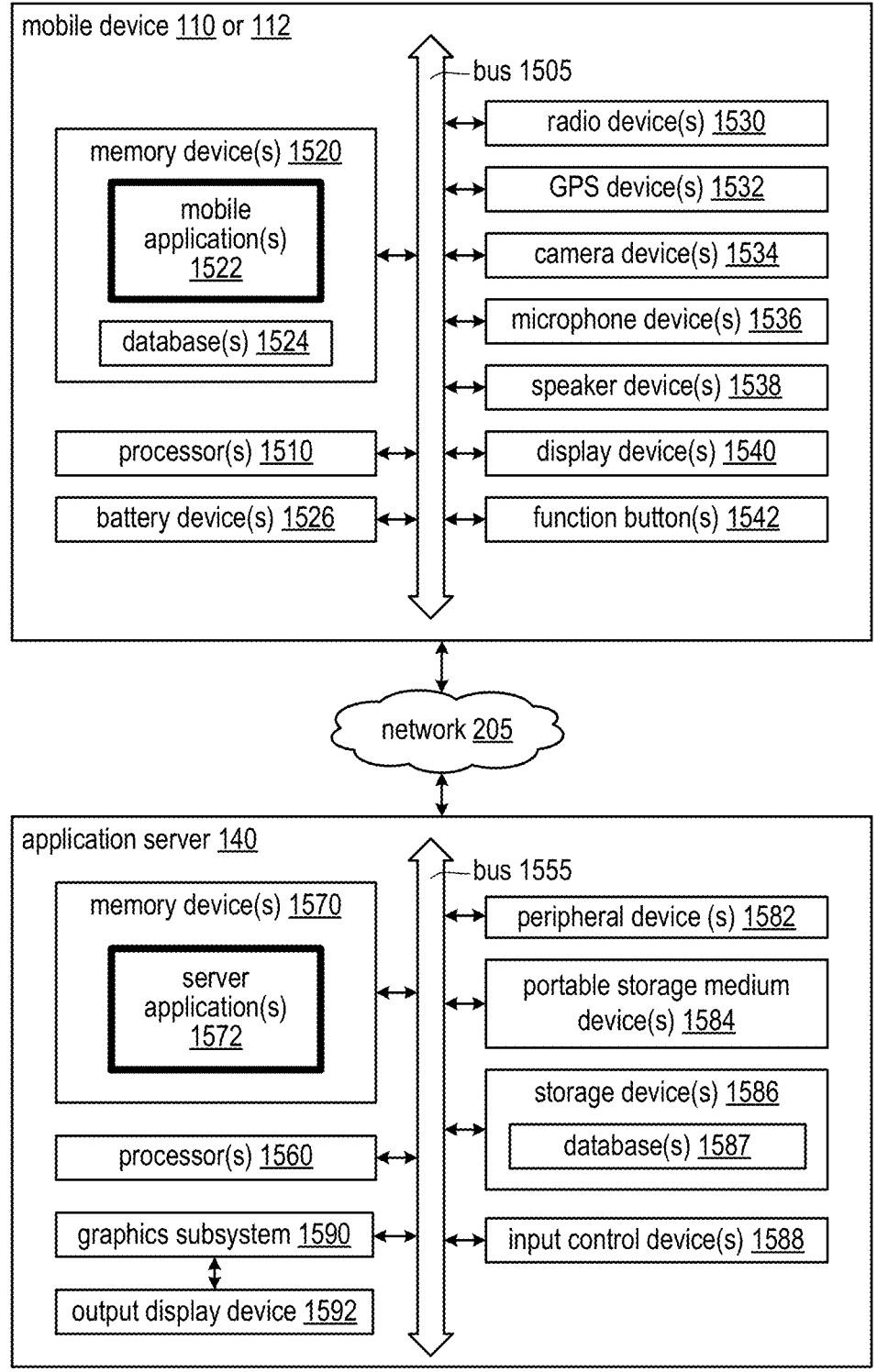
FIG. 15 is a conceptual block diagram of example computer apparatuses for the application server and the mobile device.

FIG. 15 is a conceptual block diagram of example computer apparatuses 1500 for the application server 140 and the mobile device (110, 112). The application server 140 includes, without limitation, an interconnect bus 1555, one or more processors 1560, one or more memory devices 1570, one or more storage devices 1580, one or more peripheral devices 1582, one or more portable storage medium devices 1584, one or more storage devices 1586, one or more input control devices 1588, a graphics subsystem 1590, and an output display device 1592.

The processor(s) 1560 may include, without limitation, a single microprocessor or a plurality of microprocessors for configuring the application server 140 as a multi-processor system. The memory device(s) 1570 may include banks of dynamic random access memory (DRAM), as well as cache memory. The memory device(s) 1570 store, among other things, instructions and/or data for execution by the processor(s) 1560. If the system is partially implemented in software, the memory device(s) 1570 store the executable code when in operation. For example, the memory device(s) 1570 may store one or more server applications 1572 that include executable code for performing one or more operations described herein.

For explanatory purposes, all components of the application server 140 are shown in FIG. 26 as being coupled via the bus 1555. However, the application server 140 is not so limited. Devices of the application server 140 may be coupled through one or more data transport means. For example, the processor(s) 1560 and/or the memory device(s) 1570 may be coupled via a local microprocessor bus. The storage device 1586, peripheral device(s) 1582, portable storage medium device(s) 1584, and/or graphics subsystem 1590 may be coupled via one or more input/output (I/O) buses. The storage device(s) 1586 may be nonvolatile storage device(s) for storing databases 1587, data, and/or instructions for use by the processor(s) 1560. The storage device(s) 1586 may be implemented, for example, with a magnetic disk drive or an optical disk drive. In a software embodiment, the storage device(s) 1586 may be configured for loading contents of the storage device(s) 1586 into the memory device(s) 1570.

The portable storage medium device(s) 1584 operate in conjunction with a nonvolatile portable storage medium, such as, for example, a compact disc read-only memory (CD ROM), to input and output data and code to and from the application server 140. In some embodiments, software is stored on a portable storage medium, and is inputted into the application server 140 via the portable storage medium device(s) 1582.

The peripheral device(s) 1582 may include any type of computer support device, such as, for example, an input/output (I/O) interface configured to add additional functionality to the application server 140. For example, the peripheral device(s) 1582 may include a network interface card for interfacing the application server 140 with the network 205. The network 205 may include, for example, the Internet, a local area network, a wide area network, a mobile network, a cellular network, and/or another type of network.

The input control device(s) 1588 provide a portion of the user interface for a user of the application server 140. The input control device(s) 1588 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the application server 140 may include the graphics subsystem 1590 coupled to the output display device 1592. The output display device 1592 may include a cathode ray tube (CRT) display and/or a liquid crystal display (LCD). The graphics subsystem 1590 receives textual and graphical information, and processes the information for output to the output display device 1592.

The mobile device (110, 112) includes, without limitation, an interconnect bus 1505, one or more processors 1510, one or more memory devices 1520, one or more battery devices 1526, one or more radio devices 1530, one or more GPS (Global Positioning System) devices 1532, one or more camera devices 1534, one or more microphone devices 1536, one or more speaker devices 1538, one or more display devices 1540, and one or more function buttons 1542. The processor(s) 1510 may include, without limitation, a single microprocessor or a plurality of microprocessors for configuring the mobile device (110, 112) as a multi-processor system.

The memory device(s) 1520 store, among other things, instructions and/or data for execution by the processor(s) 1510. The memory device(s) 1520 include one or more databases 1524, such as, for example, a camera roll database. If the system is partially implemented in software, the memory device(s) 1520 store the executable code when in operation. The memory device(s) 1520 may include banks of dynamic random access memory (DRAM), as well as cache memory. For example, the memory device(s) 1520 may store one or more mobile applications 1522 that include executable code for performing one or more operations described herein.

For explanatory purposes, all components in the mobile device (110, 112) are shown in FIG. 26 as being coupled via the bus 2605. However, the mobile device (110, 112) is not so limited. Devices of the mobile device (110, 112) may be coupled through one or more data transport means. For example, the processor(s) 1510 and/or the memory device(s) 1520 may be coupled via a local microprocessor bus. The radio device(s) 1530, the GPS device(s) 1532, the camera device(s) 1534, the microphone device(s) 1536, the speaker device(s) 1538, the display device(s) 1540, and the function button(s) 1542 may be coupled via one or more input/output (I/O) buses.

The mobile device (110, 112) can operate in conjunction with the application server 140 to input and output data and code to and from the mobile device (110, 112). In some embodiments, software is stored on the application server 140, and is downloaded to the memory device(s) 1520 via the radio device(s) 1530. The radio device(s) 1530 may include any type of computer support device, such as, for example, an input/output (I/O) interface configured to add additional functionality to the mobile device (110, 112). For example, the radio device(s) 1530 may include a network interface card for interfacing the mobile device (110, 112) with the network 205. The network 205 may include, for example, the Internet, a local area network, a wide area network, a mobile network, a cellular network, and/or another type of network.

The GPS device(s) 1532 includes a GPS receiver that can receive the location (e.g., latitude, longitude, and altitude) and current time from a space-based navigation system. In one embodiment, the GPS device(s) 1532 may receive the location and the current time in all weather conditions while located anywhere on, or near, the Earth where there is an unobstructed line of sight to four or more GPS satellites.

A user interface of the mobile device (110, 112) may include, without limitation, the camera device(s) 1534, the microphone device(s) 1536, the speaker device(s) 1538, the display device(s) 1540, and/or the function button(s) 1542. The camera device(s) 1534 can capture optical images by electrically converting the optical images into digital data for further processing by the mobile device (110, 112). The microphone device(s) 1536 can capture sound waves by converting the sound waves into changes in electric currents or voltage for further processing (e.g., recording or transmitting) by the mobile device (110, 112). The speaker device(s) 1538 can output sound from electrical sound signals generated by the mobile device (110, 112). The display device(s) 1540 can display textual and graphical information. The display device(s) 1540 may include, for example, a touchscreen configured to input alphanumeric information, finger swipes, and/or other finger gesture information. The function button(s) 1542 may include, for example, a volume button, a power button, a "home" button (e.g., a button that prompts the operating system to display a home screen), a virtual button displayed on the display device 1540, and/or any other button that is configured to initiate an action when pressed.

Each component of the application server 140 and the mobile device (110, 112) may represent a broad category of a computer component of a general purpose computer and/or special purpose computer. Components of the application server 140 and the mobile device (110, 112) are not limited to the specific implementations provided here. Portions of some embodiments may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments are implemented by the preparation of application-specific integrated circuits and/or by coupling an appropriate network of conventional component circuits.

Some embodiments include a computer program product. The computer program product may include a non-transitory computer-readable storage medium and/or media having instructions stored thereon and/or therein which can be used to control, or cause, a computer to perform any of the processes of some embodiments. The storage medium may include, without limitation, floppy disk, mini disk, optical disc, Blu-ray Disc, digital video disc (DVD), compact disc read-only memory (CD-ROM), micro-drive, magneto-optical disk, read-only memory (ROM), random access memory (RAM), erasable programmable read-only memory (EPROM), electrically erasable programmable read-only memory (EEPROM), dynamic random access memory (DRAM), video random access memory (VRAM), flash memory, flash card, magnetic card, optical card, nanosystems, molecular memory integrated circuit, redundant array of independent disks (RAID), remote data storage/archive/warehousing, and/or any other type of device suitable for storing instructions and/or data.

Stored on any one of the computer-readable medium and/or media, some implementations include software for controlling both the hardware of the general and/or special computer or microprocessor, and for enabling the computer and/or microprocessor to interact with a human user and/or another mechanism utilizing the results of the embodiments. Such software may include without limitation device drivers, operating systems, and user applications. Ultimately, such computer readable media further includes software for performing aspects of the embodiments, as described herein. Included in the programming and/or software of the general and/or special purpose computer or microprocessor are software modules for implementing the processes described herein. The processes described herein may include, without limitation, operations described herein.

CONCLUSION

The present technology provides a mobile social network for sharing media captured recently. The mobile social network includes an application server that receives, from a downloader mobile device, a request for media associated with a requested location. The application server sends (e.g., transmits, etc.) a media inquiry to one or more uploader mobile devices near the requested location. The media inquiry includes information from the request for media. The application server receives a digital media file in response to the media inquiry. The digital media file includes metadata having an authentic capture time of the media associated with the location. The application server generates a results summary, including a status of the digital media file based on the authentic capture time of the media. The application server sends (e.g., transmits, etc.) the results summary to the downloader mobile device.

The present technology has advantages. The mobile social network protects the authenticity and integrity of the metadata (e.g., capture time) in a digital media file. The mobile social network can thereby guarantee how recent media actually is by using authentic capture times. Wherever users around the world are uploading to the application server(s), the mobile social network can provide a reliable blurb, snapshot, and/or glimpse of what has recently happened.

It will be appreciated that the embodiments can be practiced by other means than that of the herein-described embodiments, which are presented in this description for purposes of illustration and not of limitation. The specification and drawings are not intended to limit the exclusionary scope of this patent document. It is noted that various equivalents for the particular embodiments described herein may be practiced by the embodiments as well. That is, while specific embodiments are described herein, it is evident that many alternatives, modifications, permutations and variations will become apparent in light of the description. Accordingly, it is intended that the embodiments embrace all such alternatives, modifications and variations as falling within the scope of the appended claims. The fact that a product, process, or method exhibits differences from one or more of the herein-described embodiments does not mean that the product or process is outside the scope (literal scope and/or other legally-recognized scope) of the claims.

What is claimed is:

1. A method for sharing media by using an uploader mobile device, the method comprising:

receiving, from an application server, an inquiry for media near a geographic location of the uploader mobile device;

capturing a media near the geographic location of the uploader mobile device by electrically converting an optical image into a digital representation of the optical image;

generating a digital media file that includes the digital representation and metadata, wherein the metadata includes a capture time of the media; and sending the digital media file to the application server, wherein the application server stores a results summary including a status of the digital media file, and wherein the digital media file causes the application server to generate an updated results summary by changing the status of the digital media file based on the capture time.

2. The method of claim 1, further comprising:
setting the digital media file to be automatically saved to a local media database on the uploader mobile device.

3. The method of claim 1, further comprising:
setting a price-per-download of media captured by the uploader mobile device.

4. The method of claim 1, further comprising:
setting a notification to be issued when a request for media near the geographic location is received.

5. The method of claim 1, wherein the sending of the digital media file is performed by using a mobile application that can prevent an external mobile application from changing the capture time of the media.

6. The method of claim 1, wherein the inquiry for media includes a request to capture media associated with a city.

7. The method of claim 1, wherein the inquiry for media includes a request to capture media associated with a desired angle of capture for the media.

8. The method of claim 1, wherein the inquiry for media includes information about a user of a downloader mobile device associated with the inquiry.

9. An uploader mobile device comprising:
one or more processors directed by a mobile application to perform:
receiving, from an application server, an inquiry for media near a geographic location of the uploader mobile device;
capturing a media near the geographic location of the uploader mobile device by electrically converting an optical image into a digital representation of the optical image;
generating a digital media file that includes the digital representation and metadata, wherein the metadata includes a capture time of the media; and
sending the digital media file to the application server, wherein the application server stores a results summary including a status of the digital media file, and wherein the digital media file causes the application server to generate an updated results summary by changing the status of the digital media file based on the capture time.

10. The uploader mobile device of claim 9, wherein the one or more processors are further directed by the server application to perform:
setting the digital media file to be automatically saved to a local media database on the uploader mobile device.

11. The uploader mobile device of claim 9, wherein the one or more processors are further directed by the server application to perform:
setting a price-per-download of media captured by the uploader mobile device.

12. The uploader mobile device of claim 9, wherein the one or more processors are further directed by the server application to perform:
setting a notification to be issued when a request for media near the geographic location is received.

13. The uploader mobile device of claim 9, wherein the sending of the digital media file is performed by using a mobile application that can prevent an external mobile application from changing the capture time of the media.

14. The uploader mobile device of claim 9, wherein the inquiry for media includes a request to capture media associated with a city.

15. The uploader mobile device of claim 9, wherein the inquiry for media includes a request to capture media associated with a desired angle of capture for the media.

16. The uploader mobile device of claim 9, wherein the inquiry for media includes information about a user of a downloader mobile device associated with the inquiry.

17. One or more computer-readable storage media comprising one or more instructions to enable a computer system to share media, wherein the one or more instructions, when executed, direct the one or more processors to perform actions comprising:

receiving, from an application server, an inquiry for media near a geographic location of an uploader mobile device;

capturing a media near the geographic location of the uploader mobile device by electrically converting an optical image into a digital representation of the optical image;

generating a digital media file that includes the digital representation and metadata, wherein the metadata includes a capture time of the media; and sending the digital media file to the application server, wherein the application server stores a results summary including a status of the digital media file, and wherein the digital media file causes the application server to generate an updated results summary by changing the status of the digital media file based on the capture time.

18. The one or more computer-readable storage media of claim 17, wherein the one or more instructions, when executed, further direct the one or more processors to perform:
setting the digital media file to be automatically saved to a local media database on the uploader mobile device.

19. The one or more computer-readable storage media of claim 17, wherein the one or more instructions, when executed, further direct the one or more processors to perform:
setting a price-per-download of media captured by the uploader mobile device.

20. The one or more computer-readable storage media of claim 17, wherein the one or more instructions, when executed, further direct the one or more processors to perform:

setting a notification to be issued when a request for media near the geographic location is received.

* * * * *